(12) United States Patent
Froggatt et al.

(10) Patent No.: US 12,411,278 B2
(45) Date of Patent: *Sep. 9, 2025

(54) REDUNDANT CORE IN MULTICORE OPTICAL FIBER FOR SAFETY

(71) Applicant: Intuitive Surgical Operations, Inc., Sunnyvale, CA (US)

(72) Inventors: Mark E. Froggatt, Blacksburg, VA (US); Dawn K. Gifford, Blacksburg, VA (US); Jeffrey T. LaCroix, Blacksburg, VA (US); Patrick Roye, Christiansburg, VA (US); Alexander K. Sang, Blacksburg, VA (US)

(73) Assignee: Intuitive Surgical Operations, Inc., Sunnyvale, CA (US)

( * ) Notice: Subject to any disclaimer, the term of this patent is extended or adjusted under 35 U.S.C. 154(b) by 262 days.

This patent is subject to a terminal disclaimer.

(21) Appl. No.: 18/115,736

(22) Filed: Feb. 28, 2023

(65) Prior Publication Data

US 2023/0204852 A1 Jun. 29, 2023

Related U.S. Application Data

(63) Continuation of application No. 17/203,701, filed on Mar. 16, 2021, now Pat. No. 11,624,870, which is a
(Continued)

(51) Int. Cl.
*G02B 6/02* (2006.01)
*G01B 11/16* (2006.01)
(Continued)

(52) U.S. Cl.
CPC ........ *G02B 6/02042* (2013.01); *G01B 11/161* (2013.01); *G01B 21/042* (2013.01);
(Continued)

(58) Field of Classification Search
CPC .... G02B 6/02042; G02B 6/02; G01B 11/161; G01B 21/042; G01D 5/3538; G01D 5/35303; G01D 5/35393
See application file for complete search history.

(56) References Cited

U.S. PATENT DOCUMENTS 8,531,655 B2 9/2013 Klein et al.
8,773,650 B2 7/2014 Froggatt et al.
(Continued)

FOREIGN PATENT DOCUMENTS

CN 102695938 A 9/2012
CN 103162637 A 6/2013
(Continued)

OTHER PUBLICATIONS

Extended European Search Report for Application No. EP20184050.1 mailed on Oct. 23, 2020, 7 pages.
(Continued)

*Primary Examiner* — Sung H Pak
(74) *Attorney, Agent, or Firm* — Schwegman, Lundberg & Woessner, P.A.

(57) ABSTRACT

An optical fiber includes multiple optical cores configured in the fiber including a set of primary cores and an auxiliary core. An interferometric measurement system uses measurements from the multiple primary cores to predict a response from the auxiliary core. The predicted auxiliary core response is compared with the actual auxiliary core response to determine if they differ by more than a predetermined amount, in which case the measurements from the multiple primary cores may be deemed unreliable.

20 Claims, 9 Drawing Sheets

Related U.S. Application Data continuation of application No. 16/709,341, filed on Dec. 10, 2019, now Pat. No. 10,983,268, which is a continuation of application No. 16/099,763, filed as application No. PCT/US2017/029568 on Apr. 26, 2017, now Pat. No. 10,545,283.

(60) Provisional application No. 62/334,649, filed on May 11, 2016.

(51) Int. Cl.
  *G01B 21/04* (2006.01)
  *G01D 5/353* (2006.01)

(52) U.S. Cl.
  CPC ....... *G01D 5/35303* (2013.01); *G01D 5/3538* (2013.01); *G01D 5/35393* (2013.01); *G02B 6/02* (2013.01)

(56) References Cited

U.S. PATENT DOCUMENTS

| | | | |
|---|---|---|---|
| 9,817,183 B2 | 11/2017 | Amma et al. | |
| 10,132,614 B2 | 11/2018 | Froggatt et al. | |
| 10,545,283 B2 | 1/2020 | Froggatt et al. | |
| 10,983,268 B2 * | 4/2021 | Froggatt | G01B 11/18 |
| 11,624,870 B2 * | 4/2023 | Froggatt | G01D 5/35303 |
| | | | 385/126 |
| 2002/0097960 A1 | 7/2002 | Greenaway et al. | |
| 2005/0219512 A1 | 10/2005 | Froggatt et al. | |
| 2006/0013523 A1 | 1/2006 | Childlers et al. | |
| 2007/0297711 A1 | 12/2007 | Childers et al. | |
| 2010/0054298 A1 | 3/2010 | Sasaoka et al. | |
| 2011/0182557 A1 | 7/2011 | Hayashi | |
| 2011/0317148 A1 | 12/2011 | Froggatt et al. | |
| 2012/0067118 A1 | 3/2012 | Hartog et al. | |
| 2013/0021615 A1 | 1/2013 | Duncan et al. | |
| 2013/0188176 A1 | 7/2013 | Lovely et al. | |
| 2014/0111789 A1 | 4/2014 | Carralero et al. | |
| 2014/0112615 A1 | 4/2014 | Kreger et al. | |
| 2015/0124266 A1 | 5/2015 | Davis et al. | |
| 2015/0263804 A1 | 9/2015 | Horikx et al. | |
| 2015/0346053 A1 | 12/2015 | Lally et al. | |
| 2021/0199884 A1 | 7/2021 | Froggatt et al. | |

FOREIGN PATENT DOCUMENTS

| | | | |
|---|---|---|---|
| CN | 103392120 | A | 11/2013 |
| CN | 103698842 | A | 4/2014 |
| CN | 104126103 | A | 10/2014 |
| CN | 105103018 | A | 11/2015 |
| EP | 2963465 | A1 | 1/2016 |
| JP | 2010104426 | A | 5/2010 |
| JP | 2012123247 | A | 6/2012 |
| JP | 2013505441 | A | 2/2013 |
| JP | 2015190917 | A | 11/2015 |
| KR | 20190092456 | A | 8/2019 |
| WO | WO-2011034584 | A2 | 3/2011 |
| WO | WO-2011153126 | A2 | 12/2011 |
| WO | WO-2013085833 | A1 | 6/2013 |
| WO | WO-2014201057 | A2 | 12/2014 |
| WO | WO-2016029110 | A1 | 2/2016 |
| WO | WO-2016099976 | A1 | 6/2016 |
| WO | WO-2016122742 | A2 | 8/2016 |

OTHER PUBLICATIONS

Extended European Search Report for Application No. EP22193547.1, mailed on Dec. 20, 2022, 5 pages.
International Preliminary Report on Patentability for Application No. PCT/US2017/029568, mailed on Nov. 22, 2018, 8 pages.
International Search Report and Written Opinion for Application No. PCT/US2017/029568, mailed on Jul. 21, 2017, 11 pages.
Moore J.P., "Shape Sensing Using Multi-core Fiber," Optical Fiber Communications Conference and Exhibition (OFC), Los Angeles, CA, 2015, 3 pages.
Vertut, J, and Coiffet, P., "Robot Technology: Teleoperation and Robotics Evolution and Development," English translation, Prentice-Hall, Inc., Inglewood Cliffs, NJ, USA 1986, vol. 3A, 332 pages.

* cited by examiner

REDUNDANT CORE IN MULTICORE OPTICAL FIBER FOR SAFETY

CROSS-REFERENCE TO RELATED APPLICATIONS

This application is a continuation of and claims the benefit of priority under 35 U.S.C. § 120 to U.S. patent application Ser. No. 17/203,701, filed on Mar. 16, 2021, which is a continuation of and claims the benefit of priority under 35 U.S.C. § 120 to U.S. patent application Ser. No. 16/709,341, filed on Dec. 10, 2019, now U.S. Pat. No. 10,983,268, issued on Apr. 20, 2021, which is a continuation of and claims the benefit of priority under 35 U.S.C. § 120 to U.S. patent application Ser. No. 16/099,763, filed on Nov. 8, 2018, now U.S. Pat. No. 10,545,283, issued on Jan. 28, 2020, which is a U.S. National Stage Filing under 35 U.S.C. 371 from International Application No. PCT/US2017/029568, filed on Apr. 26, 2017, and published as WO 2017/196536 A1 on Nov. 16, 2017, which claims the benefit of priority under 35 U.S.C. § 119(e) to U.S. Provisional Patent Application No. 62/334,649, filed May 11, 2016, each of which is incorporated herein by reference in its entirety.

BACKGROUND

Spun multicore fiber has been used to determine the shape of an optical fiber. A multicore fiber having four cores can be used to separate the deformation of the fiber into two bend angles (pitch and yaw), one twist angle, and the fiber elongation. These four measurements constitute four degrees of freedom. These four measurements (pitch, yaw, twist, and elongation) also represent all of the deformations that can happen to the fiber with relatively small forces.

In fiber optic based shape sensing, a multi-channel distributed strain sensing system is used to detect the change in strain for each of several cores within a multicore optical shape sensing fiber as described in U.S. Pat. No. 8,773,650, incorporated herein by reference. Multiple distributed strain measurements are combined through a system of equations to produce a set of physical measurements including curvature, twist, and axial strain as described in U.S. Pat. No. 8,531,655, incorporated herein by reference. These physical measurements can be used to determine the distributed shape and position of the optical fiber.

Some applications for shape sensing fiber require a high degree of confidence or safety in terms of the accuracy and reliability of the shape sensing output. An example application is robotic arms used in fine manufacturing, surgical, or other environments.

Another problem with shape sensing fiber applications is unforeseen or unpredictable errors that are not included in shape sensing models or model assumptions. Example errors include errors in the operation of the optical and/or electronic sensing and processing circuitry, errors in connecting fibers, human errors such as loading an incorrect calibration file to calibrate the shape sensing system, and errors caused by forces experienced by the fiber that are not included in the shape sensing model. One such parameter already described is fiber pinch. Another parameter is temperature if the shape sensing model does not account for changes due to temperature. A further concern is other parameters not yet known or identifiable. So a further need is for the technological solution to be able to detect errors that are independent from and not accounted for in the shape sensing model.

SUMMARY

The technology in this application uses a model having N degrees of freedom and N measurements to predict an additional measurement. In other words, the N degrees of freedom model is used to make N+1 measurements, and the extra measurement made using an extra or redundant core in the fiber is used as a check on the model. For example, with a five degree of freedom model of an optical shape sensing fiber having six optical cores, (the sixth core is an auxiliary or redundant core), where each segment of fiber can experience pitch, yaw, roll, tension, and spatial or temporal changes in temperature, five strains are measured and used to uniquely determine each of the five parameters (pitch, yaw, etc.) in the model. The determined five parameters are then used to predict what the strain in the sixth core should be if the model is correct and reliable, and the predicted strain is compared to the measured strain in the sixth core to determine an error. Advantageously, the technology does not require advance knowledge of any specific error in the model in order to detect that error and also detects errors of unknown origin. Adding more auxiliary or redundant signals (7 cores instead of 6 cores for the five degree of freedom model) further increases confidence and trust in shape sensing measurements.

In example embodiments, an interferometric measurement system is provided for measuring an optical fiber including multiple primary cores configured in the fiber and an auxiliary core configured in the fiber. Interferometric detection circuitry is configured to detect measurement interferometric pattern data associated with each of the multiple primary cores and the auxiliary core. This may be done when the optical fiber is placed into a sensing position. Data processing circuitry is configured to determine compensation parameters based on the detected measurement interferometric pattern data for the primary multiple cores, compare a predicted parameter value for the auxiliary core used and a measurement-based parameter value for the auxiliary core to produce a comparison, determine an unreliability of the determined compensation parameters based on the comparison, and generate a signal in response to the unreliability. The compensation parameters compensate for variations between a calibration configuration of the multiple primary cores and an actual configuration of the multiple primary core.

The signal may represent an error comprising one or more of the following: (a) an error in operation of the detection or data processing circuitry, (b) an error in an optical fiber connection, (c) an error in the calibration configuration, or (d) an error caused by a force experienced by the fiber for which a compensation parameter is not determined by the data processing circuitry. For example, the unreliability may be caused by a pinching of the optical fiber, caused by spatial or temporal changes in temperature, caused by some other phenomenon that changes the measured signals from the optical fiber, or caused by a combination thereof.

In one example application, the data processing circuitry is configured to apply the compensation parameters to subsequently-obtained measurement interferometric pattern data for the fiber.

In an example application, the predicted parameter value is a predicted phase for the auxiliary core and the measurement-based parameter value is measurement-based phase value for the auxiliary core. The data processing circuitry is configured to determine predicted phase for the auxiliary core by performing the following operations: calculate a derivative of a phase measured in each of the primary cores to obtain multiple phase derivatives; multiply the multiple phase derivatives by a conversion matrix to obtain a predicted auxiliary core phase derivative; and integrate the predicted auxiliary core phase derivative to obtain the predicted phase for the auxiliary core.

In another example application, the data processing circuitry is configured to: determine strain values for the fiber corresponding to an axial strain, a bend strain, and a twist strain on the optical fiber based on the detected measurement interferometric pattern data, and determine a shape of the optical fiber based on the determined strain values for the optical fiber corresponding to the axial strain, bend strain, and twist strain on the optical fiber.

In another example application, the data processing circuitry is configured to: determine strain values for the fiber corresponding to an axial strain, a bend strain, a twist strain, and a temperature strain on the optical fiber based on the detected measurement interferometric pattern data, and determine a shape of the optical fiber based on the determined strain values for the optical fiber corresponding to the axial strain, bend strain, twist strain, and temperature strain on the optical fiber. Temperature strain is used herein to indicate strain caused by temperature, such as caused by spatial or temporal changes in temperature occurring after calibration or after reference baseline readings are taken.

In an example implementation, the data processing circuitry is configured to generate the signal when the unreliability exceeds a predetermined threshold.

In another example implementation, the signal is representative of the unreliability.

Other example embodiments include an interferometric measurement method for measuring an optical fiber including multiple primary cores configured in the fiber and an auxiliary core configured in the fiber. The method includes:
  detecting, using interferometric detection circuitry, measurement interferometric pattern data associated with each of the multiple primary cores and the auxiliary core when the optical fiber is in a sensing position; and
  determining, using data processing circuitry, compensation parameters based on the detected measurement interferometric pattern data for the multiple primary cores, the compensation parameters compensating for variations between a calibration configuration of the multiple primary cores and an actual configuration of the multiple primary cores,
  comparing a predicted parameter value for the auxiliary core with a measurement-based parameter value for the auxiliary core to produce a comparison,
  determining an unreliability of the compensation parameters based on the comparison, and
  generating a signal indicating in response to the unreliability.

Other example embodiments include an optical fiber with five or more cores including a central core and four or more peripheral cores each at a radius distance from the central core. One or more of the five or more cores provides a temperature response different than a temperature response of the other cores. One of more of the four or more peripheral cores is at a first radius distance from the central core different from a second radius distance from the central core associated with the other four or more peripheral cores. The difference between the first radius distance and the second radius distance is at least 10% of an average radius distance associated with all of the five or more cores.

In an example implementation, the five or more cores are helically-twisted along a length of the optical fiber.

In another example implementation, the one or more cores providing a different temperature response has/have a doping or material different than the other cores.

DETAILED DESCRIPTION

Figure 1:
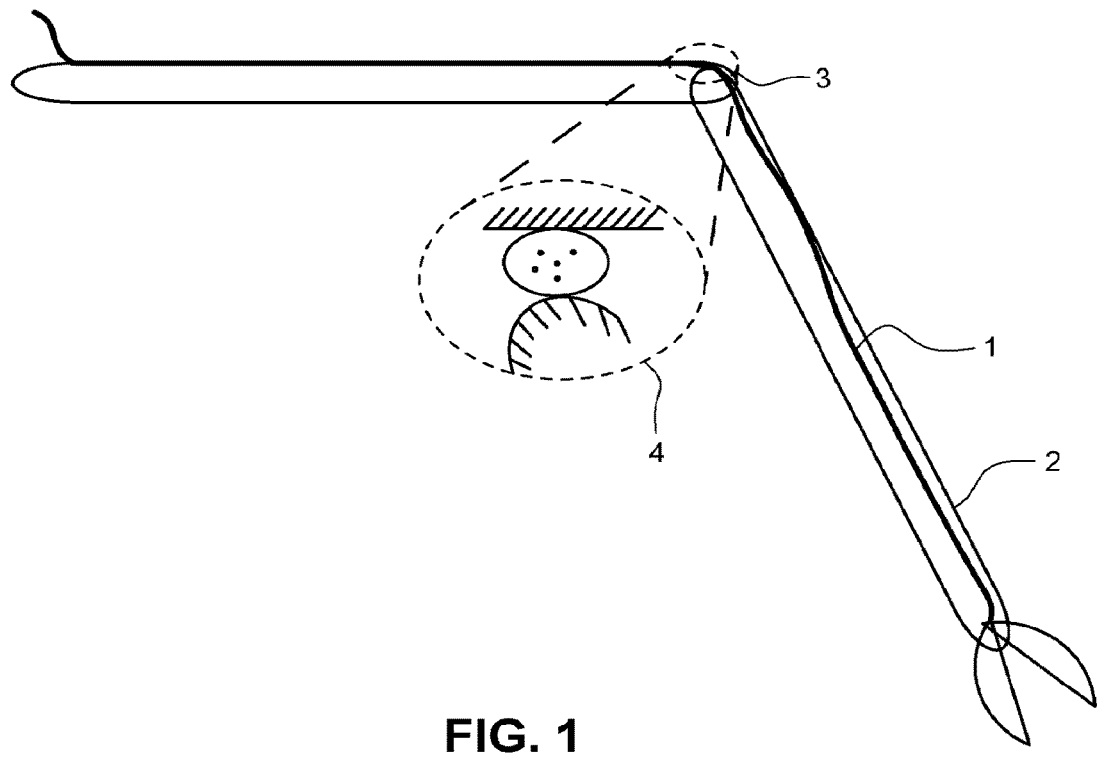
FIG. 1 shows a robotic arm with a rotatable joint that illustrates an example of fiber pinch in the joint.

The following description sets forth specific details, such as particular embodiments for purposes of explanation and not limitation. But it will be appreciated by one skilled in the art that other embodiments may be employed apart from these specific details. In some instances, detailed descriptions of well-known methods, interfaces, circuits, and devices are omitted so as not to obscure the description with unnecessary detail. Individual blocks are shown in the figures corresponding to various nodes. Those skilled in the art will appreciate that the functions of those blocks may be implemented using individual hardware circuits, using software programs and data in conjunction with a suitably programmed digital microprocessor or general purpose computer, and/or using applications specific integrated circuitry (ASIC), and/or using one or more digital signal processors (DSPs). Software program instructions and data may be stored on a non-transitory, computer-readable storage medium, and when the instructions are executed by a computer or other suitable processor control, the computer or processor performs the functions associated with those instructions.

Thus, for example, it will be appreciated by those skilled in the art that diagrams herein can represent conceptual views of illustrative circuitry or other functional units. Similarly, it will be appreciated that any flow charts, state transition diagrams, pseudocode, and the like represent various processes which may be substantially represented in computer-readable medium and so executed by a computer or processor, whether or not such computer or processor is explicitly shown.

The functions of the various illustrated elements may be provided through the use of hardware such as circuit hardware and/or hardware capable of executing software in the form of coded instructions stored on computer-readable medium. Thus, such functions and illustrated functional blocks are to be understood as being either hardware-implemented and/or computer-implemented, and thus, machine-implemented.

In terms of hardware implementation, the functional blocks may include or encompass, without limitation, a digital signal processor (DSP) hardware, a reduced instruction set processor, hardware (e.g., digital or analog) circuitry including but not limited to application specific integrated circuit(s) (ASIC) and/or field programmable gate array(s) (FPGA(s)), and (where appropriate) state machines capable of performing such functions.

In terms of computer implementation, a computer is generally understood to comprise one or more processors or one or more controllers, and the terms computer, processor, and controller may be employed interchangeably. When provided by a computer, processor, or controller, the functions may be provided by a single dedicated computer or processor or controller, by a single shared computer or processor or controller, or by a plurality of individual computers or processors or controllers, some of which may be shared or distributed. Moreover, the term "processor" or "controller" also refers to other hardware capable of performing such functions and/or executing software, such as the example hardware recited above.

Example spun or helically-twisted multicore fibers are described below for purposes of illustration and not limitation. The principles described also apply to a multicore fiber where multiple primary cores and one or more secondary (e.g., redundant or auxiliary) cores have different relative positions along a length of the optical fiber.

Because the outer cores of a spun fiber are helically-wrapped, the outer cores also experience strain as a result of a twist applied to the fiber. The outer cores are either elongated or compressed in response to the orientation of the twist to the direction of the helical wrapping. In other words, looking down the axis of the fiber with the outer cores being helically wrapped clockwise, an applied twist in the clockwise direction causes the outer cores to become compressed. Conversely, a counter-clockwise applied twist causes the outer cores to elongate (experience tension). But the center core does not experience strain as a result of twist because it is placed along the neutral axis. Thus, a four-core fiber has sufficient degrees of freedom to allow individual determination of each of three different types of strain that can be applied to the four-core fiber: axially-applied strain, bend-induced strain, and strain as a result of twist or torsion. The measured signals from four cores are used to extract four linearly independent parameters that describe a physical state of the fiber. Those four parameters include common mode strain, pitch bending, yaw bending, and twist, and they represent relatively low force changes that can be imposed on the fiber.

Pinching of the fiber is another independent modification of the fiber. Inducing significant dimensional changes via pinching requires relatively large force as compared to the low forces above.

FIG. 1 shows a robotic arm 2 having a multi-core, shape sensing fiber 1. The robotic arm 2 includes a joint 3 that permits adjoining members of the robotic arm to rotate with respect to each other around the joint 3. There may be situations where, as the members of the robotic arm move, the fiber 1 may be pinched in the joint 3, as shown in the expanded view 4. That pinching of the fiber introduces an error into the shape sensing determinations. In other words, pinching is an additional force not accounted for in the four degree of freedom model that includes common mode strain, pitch bending, yaw bending, and twist.

Figure 2:
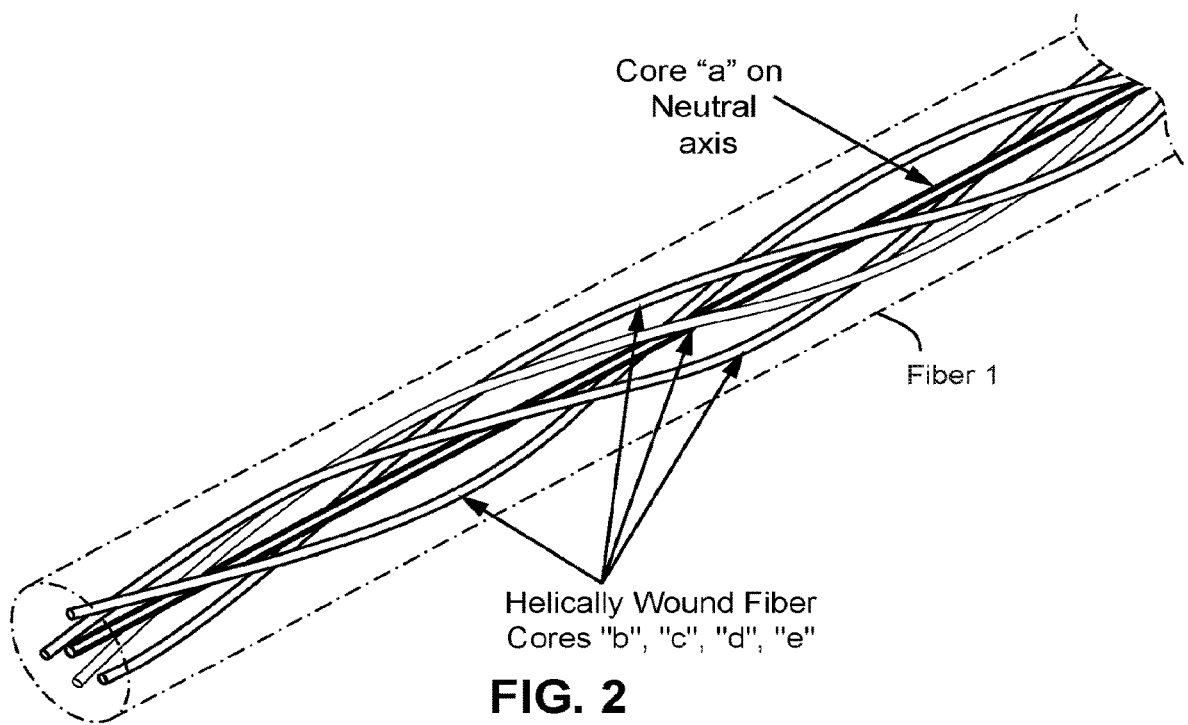
FIG. 2 shows a first twisted multicore fiber example embodiment with five cores.

FIG. 2 shows a sensing fiber 1 that is a twisted multicore fiber with five cores a-e. Core a is on or near the neutral axis, and cores b-e are intentionally offset from the neutral axis by a certain radius distance. As explained in conjunction with FIG. 3, the radial distances for all the offset cores are not all the same.

Figure 3:
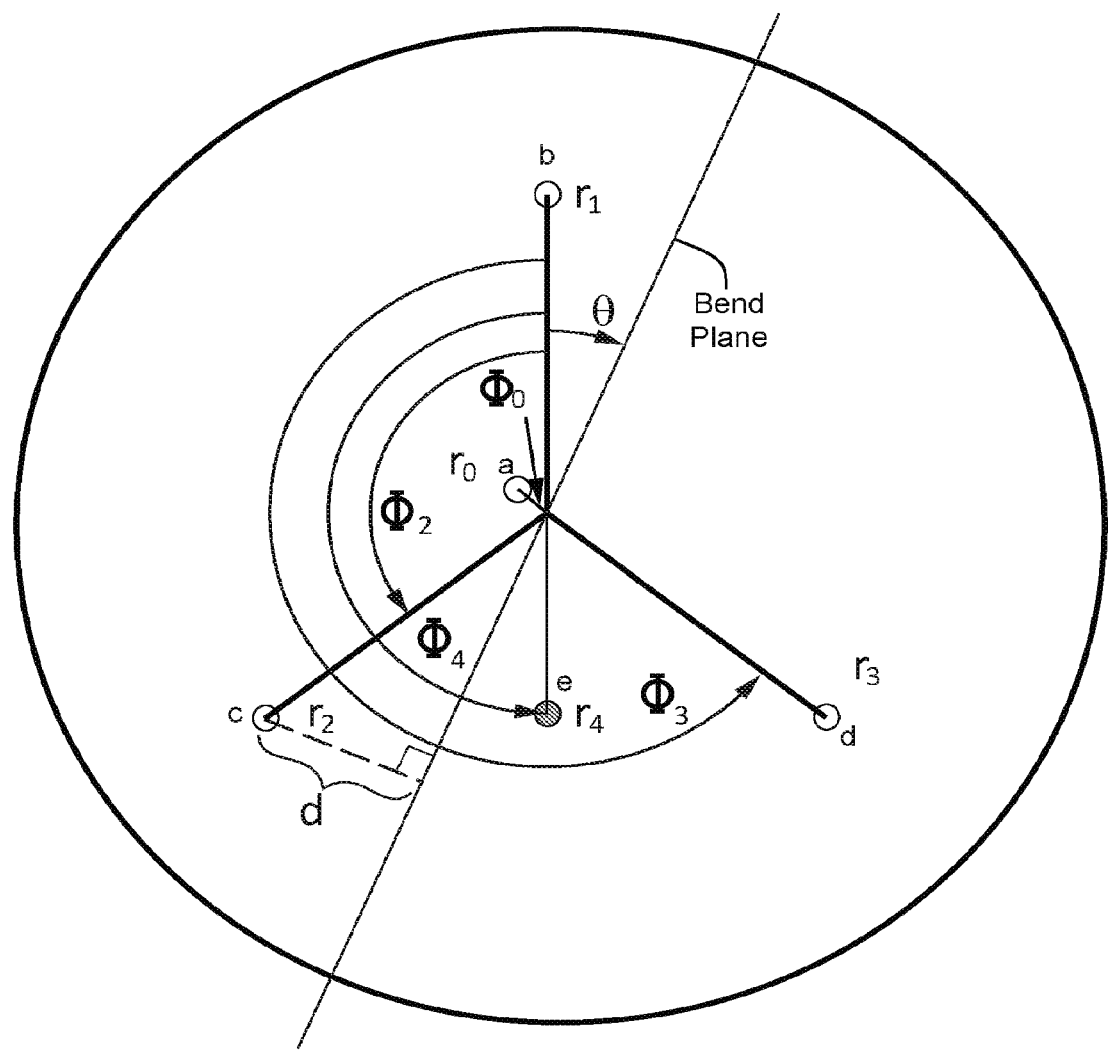
FIG. 3 illustrates mathematical parameters that can be used to quantify core placement and a response to strain for a five core, helically twisted optical fiber.

FIG. 3 illustrates mathematical parameters that can be used to quantify core placement and a response to strain for a five core, helically twisted optical fiber. Note that peripheral cores b-d are at the same radius from the center of the multi-core fiber, and peripheral core e is at a different radius than the radii of peripheral cores b-d. In this example, the radius of an auxiliary core e is less than that of cores b-d, but the radius of core e may be more than that of cores b-d. The difference between the radius distances for cores b-d and the radius distance for core e is more than an insubstantial difference. For example, the difference divided by the average radius distance for all of cores b-e is 0.10 or more. Stated differently, the difference is 10% of the average radius distance for all of cores b-e. The auxiliary core e is preferably located in the fiber in such a way so as to reduce coupling with cores a-d. In some embodiments, the average radius distance is the mean radius distance.

In an alternative example embodiment, the auxiliary redundant core e is located at the same radius as the other peripheral cores. Although the auxiliary redundant core may still be used to check the reliability of the data, this configuration is less effective at detecting errors on the central core.

FIG. 3 also illustrates mathematical parameters that can be used to quantify core placement and a response to strain for a five core, helically twisted optical fiber. A vertical axis is placed through the center of the multi-core fiber such that it passes through one of the outer cores b. The outer core b that is bisected by the vertical axis is referred to as the "reference core." Note that several parameters will be expressed relative to this core b and for the rest of this document the core identified with index n=1 serves as the reference core as an example. Two parameters describe the position of a core: the radial distance from the fiber center, r, and an arbitrary angle $\phi$ measured from the established vertical axis intersecting the reference core. As the fiber is bent, the amount of bend-induced strain in a given core is directly proportional to the perpendicular distance d that a core is separated from the bend plane. This is illustrated in the right diagram for the outer core c index n=2. If the bend plane is described by the angle $\theta$, the nature of the helical wrapping of the cores within the fiber may be determined. According to distance along the length of the fiber, $\theta$ is defined by the spin frequency of the helical fiber.

It is helpful to understand how these parameters impact the components of the strain profile of the fiber when the core strain responses are recombined. A mathematical model is established based on the parameters shown in FIG. 3. Because these parameters can be measured, they can be used to provide a more accurate recombination of the strain profile of the multi-core optical fiber. It is notable that these parameters need only be measured once for a particular multi-core optical fiber and may be used for some or all OFDR subsequent measurements of that same multi-core optical fiber.

As explained earlier, the strain applied to the multi-core fiber falls into three types or categories: bend-induced strain (B), strain as a result of torque (R), and axially-applied strain (A). The strain response of a core within the fiber possesses a component of these globally-applied strains based on its position in the multi-core fiber. The strain responses of a core at a distance along the fiber can be represented by equation (1) below:

$$\varepsilon_n = B_n(z) + R_n(z) + A_n(z) \quad (1)$$

in which n designates a core within the fiber, z represents an index along the fiber length, B is the strain experienced by the core due to bending of the fiber, R is the strain induced in the core by twist or torsion applied to the fiber, and A represents axial strain experienced by the core. Compensation for variation in core placement can be achieved by rewriting the expression in equation (1) in terms of the position of the core using the model parameters established in FIG. 3. The bend strain B perceived by a core as a result of bending of the fiber can be shown to be proportional to curvature of the bend and the tangential distance d of the core to the bend plane (shown in FIG. 3) in Equation (2) below:

$$B_n(z) = \alpha K(z) d_n(z) \quad (2)$$

in which $\alpha$ is a constant, K is the curvature of the fiber, and d represents the tangential distance of the core from the bend plane. From the model in FIG. 3, the tangential distance d can be expressed in terms of the core's position as:

$$d_n(z) = r_n[\sin(\phi_n)\cos(\theta(z)) - \cos(\phi_n)\sin(\theta(z))] \quad (3)$$

in which r is the radial distance from the axis of the fiber, $\phi$ represents the angle measured from the vertical axis, and $\theta$ is a measure of the angle between the bend plane and the horizontal axis. Combining equations (2) and (3) results in:

$$B_n(z) = \alpha K(z) r_n[\sin(\phi_n)\cos(\theta(z)) - \cos(\phi_n)\sin(\theta(z))] \quad (4)$$

This expression can be simplified by distributing the curvature term and expressing as two separate components:

$$B_n(z) = \alpha r_n \in K_x(z)\sin(\phi_n) - K_y(z)\cos(\phi_n)] \quad (5)$$

in which $K_x$ is the curvature about the horizontal axis (pitch) and $K_y$ is the curvature about the vertical axis (yaw).

For moderate levels of twist applied to a fiber (e.g., 100 degrees/meter), a first order term can be used to model strain induced by torque. Twist strain $R_n(z)$ is then expressed in terms of the core position as follows:

$$R_n(z) = \beta r_n^2 \Phi(z) \quad (6)$$

in which $\beta$ is a constant, and $\Phi$ is the amount the fiber has twisted (roll), per unit of length. To a first order, it can also be assumed that the axial strain A experienced by the cores is common to all cores within the fiber and is not dependent on the position of the cores to arrive at the expression:

$$A_n(z) = \gamma E(z) \quad (7)$$

in which $\gamma$ is a constant, and E represents axial strain. Rewriting equation (1) in terms of the core positions results in the following expression:

$$\varepsilon_n(z) = \alpha r_n K_x(z)\sin(\phi_n) - \alpha r_n K_y(z)\cos(\phi_n) + \beta r_n^2 \Phi(z) + \gamma E(z) \quad (8)$$

Considering the measured strain signals from the four cores in this example fiber embodiment, a matrix relationship can be constructed as follows:

$$\begin{bmatrix} \varepsilon_0(z) \\ \varepsilon_1(z) \\ \varepsilon_2(z) \\ \varepsilon_3(z) \end{bmatrix} = \begin{bmatrix} \alpha r_0 \sin(\phi_0) & -\alpha r_0 \cos(\phi_0) & \beta r_0^2 & \gamma \\ \alpha r_1 \sin(\phi_1) & -\alpha r_1 \cos(\phi_1) & \beta r_1^2 & \gamma \\ \alpha r_2 \sin(\phi_2) & -\alpha r_2 \cos(\phi_2) & \beta r_2^2 & \gamma \\ \alpha r_3 \sin(\phi_3) & -\alpha r_3 \cos(\phi_3) & \beta r_3^2 & \gamma \end{bmatrix} \begin{bmatrix} K_x(z) \\ K_y(z) \\ \Phi(z) \\ E(z) \end{bmatrix} \quad (9)$$

This expression in equation (9) allows recombination of individual strain signals of each independent core within the shape fiber, according to fiber structure variations, and sorting of these signals into strains that are applied to the entire multi-core fiber structure. Any number of linear combinations can be derived from equation (9) to create expressions that relate the strain response of a core to a component of the strain profile.

If the four parameters $K_x$—the curvature about the horizontal axis (pitch), $K_y$—the curvature about the vertical axis (yaw), $\Phi$—the amount of twist (roll), and E—the axial strain are the only significant deformations present in the fiber, and the phase deformation in four (4) cores is accurately measured, then the phase in an additional or auxiliary or redundant ($5^{th}$) core in the fiber may be calculated from this four core measurement and compared to a phase measurement for the auxiliary or redundant ($5^{th}$) core in the fiber. If the phase measured in the auxiliary ($5^{th}$) core differs from the phase predicted by the other four cores for the auxiliary ($5^{th}$) core, then there are two possibilities to address: the phase deformation measure of at least one of the five cores is inaccurate, meaning there is an error of some sort, or a physical deformation of the fiber other than the listed four parameters is present, meaning that the optical shape sensing model or its underlying assumptions is/are incomplete. In either case, the current measurement may be assumed to be flawed, and the shape calculated may be considered unreliable and a potential hazard.

Consider the following equation that includes the auxiliary or redundant ($5^{th}$) core in the fiber represented by the variable $\Delta$:

$$\begin{bmatrix} K_x \\ K_y \\ \Phi \\ E \\ \Delta \end{bmatrix} = M \begin{bmatrix} \varepsilon_1 \\ \varepsilon_2 \\ \varepsilon_3 \\ \varepsilon_4 \\ \varepsilon_5 \end{bmatrix} \quad (10)$$

A matrix, M, is constructed to calculate the physical parameters and how much the measured strain in the $5^{th}$ core departs from the modeled strain for $\Delta$.

Equation (9) may be extended to include more cores than just four. Equation (11) shows a five core example.

$$\begin{bmatrix} \varepsilon_0 \\ \varepsilon_1 \\ \varepsilon_2 \\ \varepsilon_3 \\ \varepsilon_4 \end{bmatrix} = \begin{bmatrix} \alpha r_0 \sin(\phi_0) & -\alpha r_0 \cos(\phi_0) & \beta r_0^2 & \gamma_0 \\ \alpha r_1 \sin(\phi_1) & -\alpha r_1 \cos(\phi_1) & \beta r_1^2 & \gamma_1 \\ \alpha r_2 \sin(\phi_2) & -\alpha r_2 \cos(\phi_2) & \beta r_2^2 & \gamma_2 \\ \alpha r_3 \sin(\phi_3) & -\alpha r_3 \cos(\phi_3) & \beta r_3^2 & \gamma_3 \\ \alpha r_4 \sin(\phi_4) & -\alpha r_4 \cos(\phi_4) & \beta r_4^2 & \gamma_5 \end{bmatrix} \begin{bmatrix} K_x \\ K_y \\ \Phi \\ E \end{bmatrix} \quad (11)$$

The variables are renamed to clean up the notation:

$$\begin{bmatrix} \varepsilon_0 \\ \varepsilon_1 \\ \varepsilon_2 \\ \varepsilon_3 \\ \varepsilon_4 \end{bmatrix} = \begin{bmatrix} BY_0 & BX_0 & R_0 & G_0 \\ BY_1 & BX_1 & R_1 & G_1 \\ BY_2 & BX_2 & R_2 & G_2 \\ BY_3 & BX_3 & R_3 & G_3 \\ BY_4 & BX_4 & R_4 & G_4 \end{bmatrix} \begin{bmatrix} K_x \\ K_y \\ \Phi \\ E \end{bmatrix} \quad (11A)$$

The matrix in equations (11 and 11A) is not invertible because it is not square. Equation 11A is broken into two equations:

$$\begin{bmatrix} \varepsilon_0 \\ \varepsilon_1 \\ \varepsilon_2 \\ \varepsilon_3 \end{bmatrix} = \begin{bmatrix} BY_0 & BX_0 & R_0 & G_0 \\ BY_1 & BX_1 & R_1 & G_1 \\ BY_2 & BX_2 & R_2 & G_2 \\ BY_3 & BX_3 & R_3 & G_3 \end{bmatrix} \begin{bmatrix} K_x \\ K_y \\ \Phi \\ E \end{bmatrix} \quad (12A)$$

which is a reproduction of equation 9, and $$\varepsilon_4 = \begin{bmatrix} BY_4 & BW_4 & R_4 & G_4 \end{bmatrix} \begin{bmatrix} K_x \\ K_y \\ \Phi \\ E \end{bmatrix} \quad (12B)$$

The result is a square matrix in equation (11A) which is invertible and is designated matrix H:

$$\begin{bmatrix} K_x \\ K_y \\ \Phi \\ E \end{bmatrix} = \begin{bmatrix} BY_0 & BX_0 & R_0 & G_0 \\ BY_1 & BX_1 & R_1 & G_1 \\ BY_2 & BX_2 & R_2 & G_2 \\ BY_3 & BX_3 & R_3 & G_3 \end{bmatrix}^{-1} \begin{bmatrix} \varepsilon_0 \\ \varepsilon_1 \\ \varepsilon_2 \\ \varepsilon_3 \end{bmatrix} = H \begin{bmatrix} \varepsilon_0 \\ \varepsilon_1 \\ \varepsilon_2 \\ \varepsilon_3 \end{bmatrix} \quad (13)$$

The following substitution is made by substituting the results of equation 13 into equation 12B:

$$\varepsilon_4 = \begin{bmatrix} BY_4 & BW_4 & R_4 & G_4 \end{bmatrix} \begin{bmatrix} BY_0 & BX_0 & R_0 & G_0 \\ BY_1 & BX_1 & R_1 & G_1 \\ BY_2 & BX_2 & R_2 & G_2 \\ BY_3 & BX_3 & R_3 & G_3 \end{bmatrix}^{-1} \begin{bmatrix} \varepsilon_0 \\ \varepsilon_1 \\ \varepsilon_2 \\ \varepsilon_3 \end{bmatrix} \quad (14)$$

which provides an explicit way to calculate a predicted strain in the $5^{th}$ core based on our physical model and the strains measured in the other 4 cores. The above equation may be reduced to an algebraic expression by defining:

$$\begin{bmatrix} a & b & c & d \end{bmatrix} = \begin{bmatrix} BY_4 & BW_4 & R_4 & G_4 \end{bmatrix} \begin{bmatrix} BY_0 & BX_0 & R_0 & G_0 \\ BY_1 & BX_1 & R_1 & G_1 \\ BY_2 & BX_2 & R_2 & G_2 \\ BY_3 & BX_3 & R_3 & G_3 \end{bmatrix}^{-1} \quad (15)$$

and writing:

$$\varepsilon_{4pred} = a\varepsilon_0 + b\varepsilon_1 + c\varepsilon_2 + d\varepsilon_3 \quad (16)$$

The error is the difference between the predicted strain based on the model, $\varepsilon_{4pred}$ and the actual measured value of strain in the $5^{th}$ core, $\varepsilon_{4meas}$:

$$\Delta = \varepsilon_{4pred} - \varepsilon_{4meas} = a\varepsilon_0 + b\varepsilon_1 + c\varepsilon_2 + d\varepsilon_3 - \varepsilon_{4meas} \quad (17)$$

If we further define, $$\begin{bmatrix} h_{00} & h_{01} & h_{02} & h_{03} \\ h_{10} & h_{11} & h_{12} & h_{13} \\ h_{20} & h_{21} & h_{22} & h_{23} \\ h_{30} & h_{31} & h_{32} & h_{33} \end{bmatrix} = \begin{bmatrix} BY_0 & BX_0 & R_0 & G_0 \\ BY_1 & BX_1 & R_1 & G_1 \\ BY_2 & BX_2 & R_2 & G_2 \\ BY_3 & BX_3 & R_3 & G_3 \end{bmatrix}^{-1} \quad (18)$$

where $h_{nm}$ are the entries of matrix H above in equation 13, then a matrix implementation is constructed for the calculation of the physical parameter and a measure, $\Delta$, of how the strain in the $5^{th}$ core differs from that predicted by the model.

$$\begin{bmatrix} K_x \\ K_y \\ \Phi \\ E \\ \Delta \end{bmatrix} = \begin{bmatrix} h_{00} & h_{01} & h_{02} & h_{03} & 0 \\ h_{10} & h_{11} & h_{12} & h_{13} & 0 \\ h_{20} & h_{21} & h_{22} & h_{23} & 0 \\ h_{30} & h_{31} & h_{32} & h_{33} & 0 \\ a & b & c & d & -1 \end{bmatrix} \begin{bmatrix} \varepsilon_0 \\ \varepsilon_1 \\ \varepsilon_2 \\ \varepsilon_3 \\ \varepsilon_4 \end{bmatrix} \quad (19)$$

where the matrix we were originally looking for, M, is given by:

$$M = \begin{bmatrix} h_{00} & h_{01} & h_{02} & h_{03} & 0 \\ h_{10} & h_{11} & h_{12} & h_{13} & 0 \\ h_{20} & h_{21} & h_{22} & h_{23} & 0 \\ h_{30} & h_{31} & h_{32} & h_{33} & 0 \\ a & b & c & d & -1 \end{bmatrix} \quad (20)$$

where $h_{nm}$ are the entries of matrix H above in equation 13. The H matrix relates a set of strains to an equal number of physical parameters, while the M matrix includes a calculated error parameter.

In a practical example embodiment, to find the strain (E) and error ($\Delta$) independently, the other three parameters (twist ($\Phi$), bend-x ($K_x$), and bend-y ($K_y$)) are determined, and the fiber is calibrated for all of these effects.

The calibration begins by determining the core geometries (radii and angles) for all five cores, (see FIG. 3). By measuring the strain in the cores at different tensions, values for the parameters $\gamma_n$ for equation (11) are determined. From these data sets, the matrix in equation (11) is determined for calculating fiber pitch ($K_x$), yaw ($K_y$), twist ($\Phi$), strain (E), and error ($\Delta$) from the OFDR measurements for the five cores.

$$\begin{bmatrix} \text{pitch} \\ \text{yaw} \\ \text{twist} \\ \text{strain} \\ \text{error} \end{bmatrix} = \begin{bmatrix} K_x \\ K_y \\ \Phi \\ E \\ \Delta \end{bmatrix} = M \begin{bmatrix} \varepsilon_1 \\ \varepsilon_2 \\ \varepsilon_3 \\ \varepsilon_4 \\ \varepsilon_5 \end{bmatrix} = \quad (21)$$

Keeping in mind the matrix relating the four low-force stimuli (temperature is not considered here) to the strains $\varepsilon_0$-$\varepsilon_4$ in the five cores defined in equation (11), the fiber is placed in a continuous bend in a plane. Once the fiber is placed in this configuration, a multiple channel OFDR system measures the distributed strain response of each of the cores within the multi-core optical fiber. The resulting strain response signal typically alternates between compression and elongation at a frequency that matches the spin frequency of the helical wrapping of an outer core as it proceeds through a bend. The magnitude of this oscillation should also be slowly varying along the length of the fiber as this magnitude will be proportional the bend radius of the loop described above. These strain responses are then provided to one or more data processors for extraction of the parameters that quantify variation from an ideal fiber structure.

To determine the core location, a complex-valued signal with both amplitude and phase is determined from the real-valued strain response provided by the OFDR system. A Fourier transform allows a filter to be applied to the measured scatter signal at the spin frequency of the helical wrapping. An inverse Fourier transform of this filtered signal produces a complex-valued spin signal. The amplitude of this complex spin signal is proportional to the radial separation distance of the core from the neutral center axis of the fiber. The phase response of the complex spin signal is based on the angular position of the core within the geometry of the fiber. Comparing the complex spin signal of a core to the spin signal of a reference core determines that core's position relative to the reference core. Thus, all angular positions can be found relative to the vertical axis that bisects the reference core by extracting the argument of a complex quotient between a core's spin signal and the reference core spin signal. Extracting the amplitude provides a ratio measurement of radial separation of the core relative to the reference core.

From this, the matrix below is populated, where the magnitude of the bend response is still unknown because the bend amplitude of the fiber in the spiral in-plane configuration (X and Y) is still not known.

$$\begin{bmatrix} \varepsilon_0 \\ \varepsilon_1 \\ \varepsilon_2 \\ \varepsilon_3 \\ \varepsilon_4 \end{bmatrix} = \begin{bmatrix} \alpha Y_0 & -\alpha X_0 & 0 & 0 \\ \alpha Y_1 & -\alpha X_1 & 0 & 0 \\ \alpha Y_2 & -\alpha X_2 & 0 & 0 \\ \alpha Y_3 & -\alpha X_3 & 0 & 0 \\ \alpha Y_4 & -\alpha X_3 & 0 & 0 \end{bmatrix} \begin{bmatrix} K_x \\ K_y \\ \Phi \\ E \end{bmatrix} \quad (22)$$

A twist is applied to the fiber without changing its shape. From this the response of each core to twist alone (R) may be determined.

$$\begin{bmatrix} \varepsilon_0 \\ \varepsilon_1 \\ \varepsilon_2 \\ \varepsilon_3 \\ \varepsilon_4 \end{bmatrix} = \begin{bmatrix} \alpha Y_0 & -\alpha X_0 & R_0 & 0 \\ \alpha Y_1 & -\alpha X_1 & R_1 & 0 \\ \alpha Y_2 & -\alpha X_2 & R_2 & 0 \\ \alpha Y_3 & -\alpha X_3 & R_3 & 0 \\ \alpha Y_4 & -\alpha X_3 & R_4 & 0 \end{bmatrix} \begin{bmatrix} K_x \\ K_y \\ \Phi \\ E \end{bmatrix} \quad (23)$$

Putting the fiber into a known bend provides known amplitudes for the bend coefficients (B).

$$\begin{bmatrix} \varepsilon_0 \\ \varepsilon_1 \\ \varepsilon_2 \\ \varepsilon_3 \\ \varepsilon_4 \end{bmatrix} == \begin{bmatrix} BY_0 & -BX_0 & R_0 & 0 \\ BY_1 & -BX_1 & R_1 & 0 \\ BY_2 & -BX_2 & R_2 & 0 \\ BY_3 & -BX_3 & R_3 & 0 \\ BY_4 & -BX_3 & R_4 & 0 \end{bmatrix} \begin{bmatrix} K_x \\ K_y \\ \Phi \\ E \end{bmatrix} \quad (24)$$

Putting the fiber in a straight line tension (G) allows a determination of the response of each core to the tension (G).

$$\begin{bmatrix} \varepsilon_0 \\ \varepsilon_1 \\ \varepsilon_2 \\ \varepsilon_3 \\ \varepsilon_4 \end{bmatrix} == \begin{bmatrix} BY_0 & -BX_0 & R_0 & G_0 \\ BY_1 & -BX_1 & R_1 & G_1 \\ BY_2 & -BX_2 & R_2 & G_2 \\ BY_3 & -BX_3 & R_3 & G_3 \\ BY_4 & -BX_3 & R_4 & G_4 \end{bmatrix} \begin{bmatrix} K_x \\ K_y \\ \Phi \\ E \end{bmatrix} \quad (25)$$

Using this matrix, we can then find the matrix M as described above.

Figure 4:
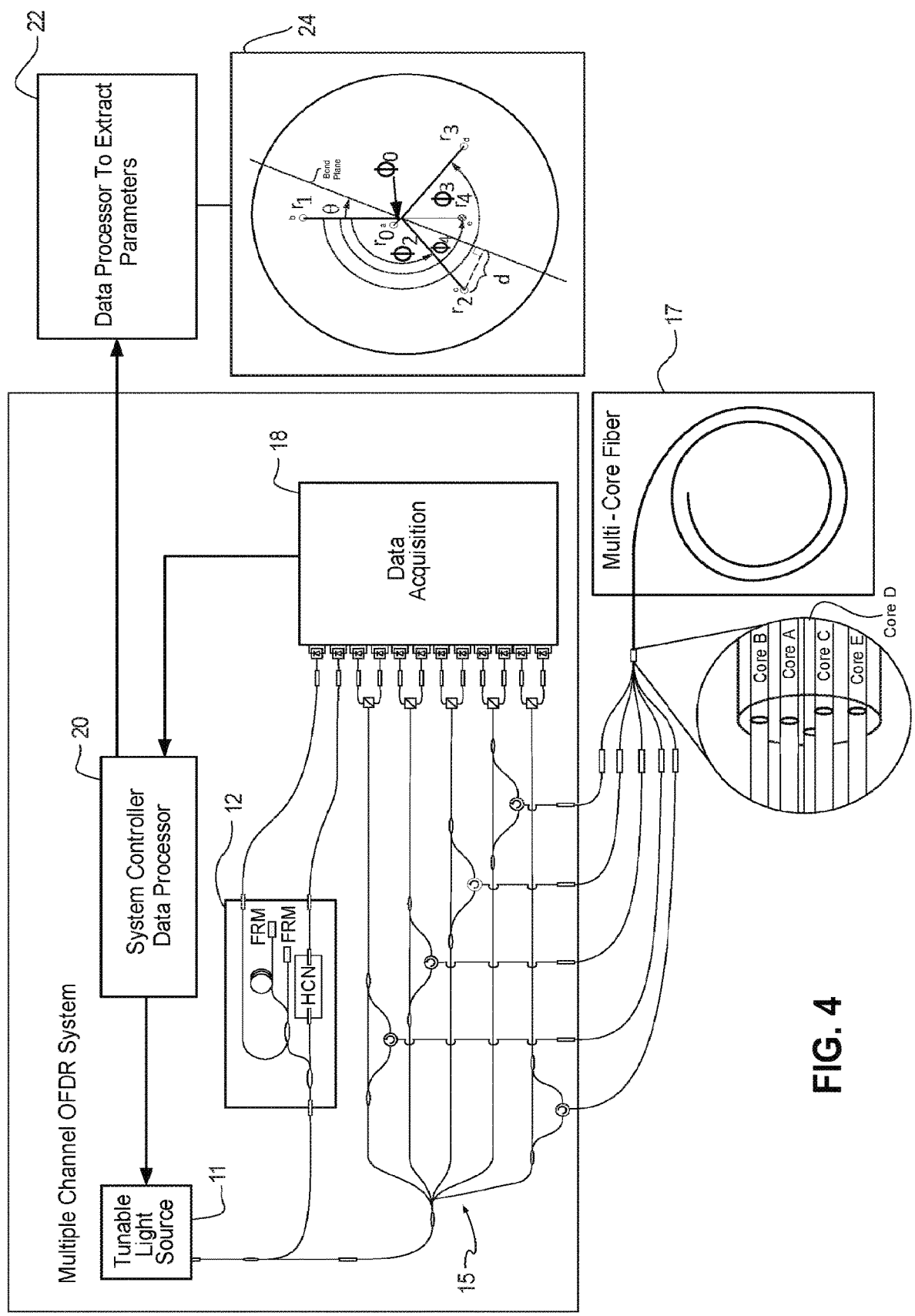
FIG. 4 shows a schematic diagram of a first example embodiment of an optical frequency domain reflectometry (OFDR)-based shape sensing system that identifies errors independent from the model and assumptions of the shape sensing system using a five core fiber.

FIG. 4 shows a schematic diagram of a first example embodiment of an optical frequency domain reflectometry (OFDR)-based shape sensing system that identifies errors independent from the model and assumptions of the shape sensing system using a five core fiber.

An OFDR-based distributed strain sensing system includes a light source 11, an interferometric interrogator 15, a laser monitor network 12, an optical sensing fiber 17 that is a multicore shape sensing fiber, acquisition electronics 18, and a data processor 20. A single channel corresponds to a single fiber core. During an OFDR measurement, a tunable light source 11 is swept through a range of optical frequencies. This light is split with the use of optical couplers and routed to separate interferometers. A laser monitor network 12 contains a Hydrogen Cyanide (HCN) gas cell that provides an absolute wavelength reference throughout the measurement scan. An interferometer within a laser monitor network 12 is used to measure fluctuations in tuning rate as the light source is scanned through a frequency range.

Interferometric interrogators 15 are connected to respective individual cores in a length of sensing fiber 17 that is a multicore shape sensing fiber. Light enters the sensing fiber 17 through the measurement arms of the five interferometric interrogators referenced generally at 15 corresponding to five core waveguides A, B, C, D, and E in the fiber 17. Scattered light from each core in the sensing fiber 17 is then interfered with light that has traveled along the reference arm of the corresponding interferometric interrogator 15. Although the term core is used, the technology applies to other types of waveguides that can be used in a spun fiber. Each pairing of an interferometric interrogator with a waveguide in the multi-core fiber is referred to as an acquisition channel. As the tunable light source 11 is swept, each channel is simultaneously measured, and the resulting interference pattern from each channel is routed to the data acquisition electronics 18 adapted for the additional interferometric interrogators 15. Each channel is processed independently and identically.

A series of optical detectors (e.g., photodiodes) convert the light signals from the laser monitor network, gas cell, and the interference patterns from each core from the sensing fiber to electrical signals. One or more data processors in data acquisition electronics 18 uses the information from the laser monitor network 12 to resample the detected interference patterns of the sensing fiber 16 so that the patterns possess increments constant in optical frequency. This step is a mathematical requisite of the Fourier transform operation. Once resampled, a Fourier transform is performed by the system controller data processor 20 to produce a light scatter signal in the temporal domain. In the temporal domain, the amplitudes of the light scattering events are depicted verses delay along the length of the fiber. Using the distance that light travels in a given increment of time, this delay can be converted to a measure of length along the sensing fiber. In other words, the light scatter signal indicates each scattering event as a function of distance along the fiber. The sampling period is referred to as the spatial resolution and is inversely proportional to the frequency range that the tunable light source 10 was swept through during the measurement.

As the fiber is strained, the local light scatters shift as the fiber changes in physical length. These distortions are highly repeatable. Hence, an OFDR measurement of detected light scatter for the fiber can be retained in memory that serves as a reference pattern of the fiber in an unstrained state. A subsequently measured scatter signal when the fiber is under strain may then be compared to this reference pattern by the system controller data processor 20 to gain a measure of shift in delay of the local scatters along the length of the sensing fiber. This shift in delay manifests as a continuous, slowly varying optical phase signal when compared against the reference scatter pattern. The derivative of this optical phase signal is directly proportional to change in physical length of the sensing core. Change in physical length may be scaled to strain thereby producing a continuous measurement of strain along the sensing fiber.

The data processor 22 coupled to the system controller data processor 20 extracts parameters 24 relating to the actual physical configuration of the cores a, b, c, d, and e in fiber 17 that are used to calibrate or otherwise compensate the OFDR measurements to account for the variations between the actual optical core configuration and an optimal optical core configuration. The mathematical model described in detail above is first established that depicts parameters that describe variations from an optimal multi-core fiber configuration, where the term "optimal" includes known and unknown configurations. Parameters are then defined that compensate for variation in the physical properties of the optical cores within the multi-core fiber.

Figure 5:
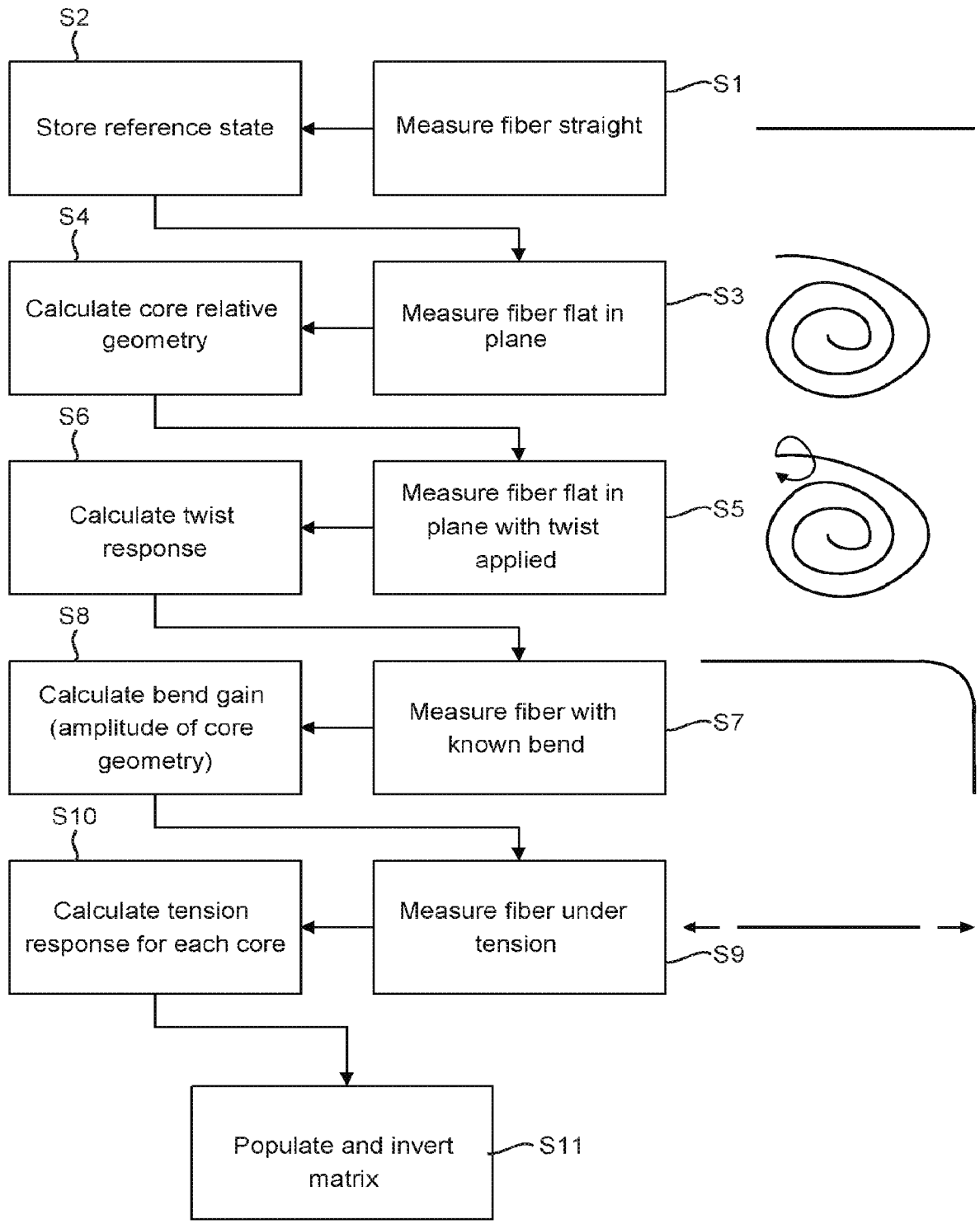
FIG. 5 is a flowchart diagram for calibrating the optical shape sensing fiber in the first example embodiment.

FIG. 5 is a flowchart diagram for calibrating a five core optical shape sensing fiber. Initially, the multicore fiber is placed in a straight line, unstrained configuration, an OFDR measurement is performed (step S1) as described above, and the resulting reference state parameters are stored (step S2). The multicore fiber is then configured in a known configuration such as in a flat plane, in a helical shape (e.g., a screw), etc. In a non-limiting example, the multicore fiber is configured in a flat plane (step S3) to calculate the relative geometry between the cores in the fiber (step S4). A twist is applied in this configuration (step S5), and a twist response is determined (step S6). The fiber is then configured into a known bend position (step S7), and a bend gain is calculated that provides amplitude values of the core geometry (step S8). The fiber is placed under tension (step S9), and a tension response for each core calculated (step S10). The values needed to populate the matrix in equation (25) above, which describes the response of the five cores to bend, strain, and twist, are then available (step S11), and the matrix can be calculated using the steps described above in equations (15)-(20). The error term, A may then be used to detect one or more errors in shape sensing applications using that shape sensing fiber such as pinch, errors in the electronics, etc.

Figure 6:
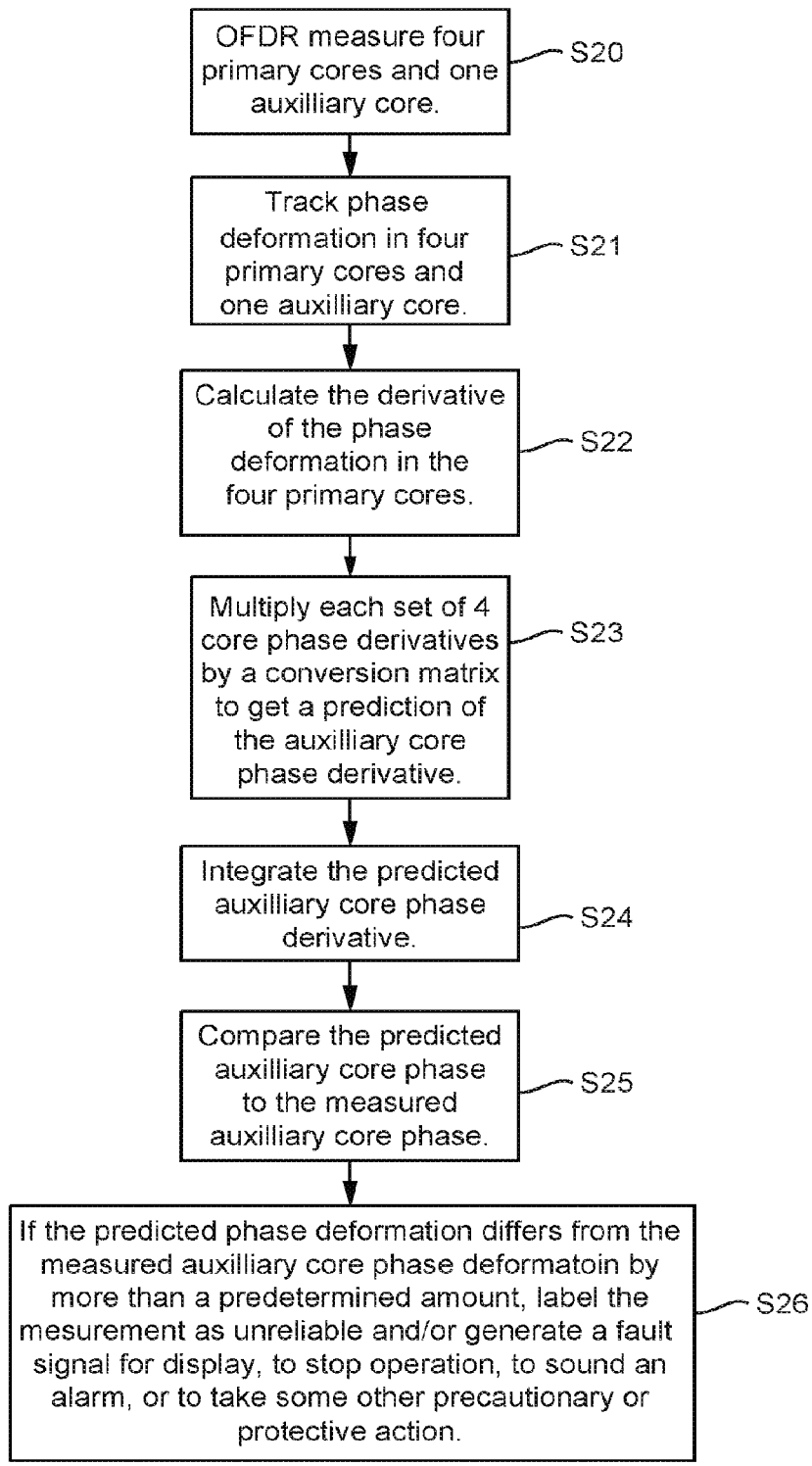
FIG. 6 is a flowchart diagram for detecting an error in shape sensing system of the first example embodiment.

FIG. 6 is a flowchart diagram carried out by the system controller for detecting an error in shape sensing system using a calibrated shape sensing fiber having four primary cores and one auxiliary core in accordance with the first example embodiment. Initially, the calibrated shape sensing fiber is placed as desired for shape sensing, and OFDR scatter measurements are obtained for each of the five cores (four primary cores and one secondary core (also called auxiliary core or redundant core)) (step S20). The data processor 22 tracks the optical phase signal for each core determined from these scatter measurements as compared to the calibrated reference scatter patterns for each corresponding core for this fiber (step S21). Each of the optical phase signals is a measure of shift in delay of the local scatters along the length of its respective core in the sensing fiber. The derivative of this optical phase signal is calculated for each of the four primary cores (step S22), which is directly proportional to change in physical length of its respective core. Each of the four phase derivatives is multiplied by the conversion matrix M from equation (20) to determine the applied bend, strain, and twist, and then the parameters describing the $5^{th}$ are used to produce a measurement of the predicted phase derivative of the auxiliary core (step S23) and the measured phase derivative of the auxiliary core.

If the difference between the predicted measurement of the auxiliary and actual measurement of the auxiliary core differ by more than a predetermined amount, (one non-limiting example amount might be 0.5 radians), the OFDR shape sensing measurements are labeled unreliable and/or one or more the following actions is taken or initiated: generate a fault signal for display, stop operation of the system or machine associated with the shape sensing fiber, generate an alarm, and/or take some other precautionary or protection action (step S26).

Second Example Embodiment

Temperature can also change the apparent length of the cores and represents a fifth degree of "freedom" in the system. Many shape sensing systems do not distinguish between temperature changes along the length of the fiber and axial strain changes along the length of the fiber.

A shape sensing system is now described that mitigates or compensates for the errors imposed by differences in a shape sensing optical fiber's response to temperature and strain. In other words, the shape sensing model in the second example embodiment explicitly addresses and compensates for the effect of temperature in the shape sensing calculations. In contrast, the first example embodiment did not, which means that any temperature effects on the shape sensing determinations in the first embodiment are detected as part of the error calculation described above.

However, in this second example embodiment, a fifth core is incorporated as one of five primary cores that has a different temperature dependence from the other four primary cores in a twisted multicore optical fiber. In addition, a sixth auxiliary core is added. It should be appreciated that while much of the description below is in the context of these five and six core examples, the principles described in the first and second embodiments apply to twisted multicore fibers with different numbers of cores. The temperature sensing or auxiliary cores are preferably located in the fiber in such a way so as to reduce or minimize coupling between cores.

In one example embodiment, the fifth primary core has a different thermal dependence by having a different refractive index from that of the other four primary cores. Example ways to achieve that different refractive index include the fifth primary core being composed of a different material and/or being differently doped. Other ways are possible to achieve a different temperature dependence such as for example locating a fifth primary core at a different radius (closer or further from the center of the fiber) than the other four primary cores, providing the fifth primary core with a different geometry (bigger or smaller than the other cores), etc.

Four of the primary cores may be doped with germanium, and a fifth primary core may be co-doped with boron and germanium. Boron doping induces thermal stress in polarization maintaining optical fiber, and as a result, the thermal response of a core containing boron to has a different thermal dependence as compared to typical germanium-doped fiber. Although other dopants may be used to create a different thermal dependence as compared to typically doped fibers in a multicore fiber, boron is also used in example embodiments as a co-dopant with germanium because that co-doping also forms a more photo-sensitive guiding core as compared to typical germanium-doped fiber. Moreover, boron is a relatively common dopant for optical fiber which provides further practical advantages.

Figure 7:
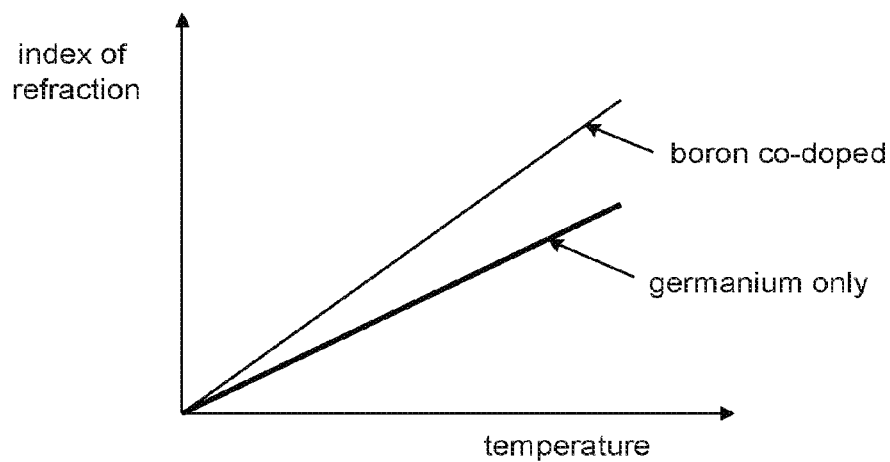
FIG. 7 shows a graph of index of refraction versus temperature for a boron-germanium co-doped core and a germanium only doped core.

FIG. 7 shows a graph of index of refraction versus temperature for a boron-geranium co-doped core and a geranium doped core. As temperature increases, the index of refraction for a boron-germanium co-doped core increases at a different (higher) rate than the index of refraction for a typical germanium-doped core. The fifth primary core reacts differently to temperature changes, and therefore, provides an additional, linearly-independent source of information that is used to compensate for temperature.

Errors and/or uncertainties arise in the determination of fiber position and/or shape—and more generally strain—due to variations in the structure of the multi-core optical fiber. The first category of variation is core placement. This variation causes both the radial separation and the angular position of a given core to differ from designed or desired ideal values or to simply be unknown. A mathematical model is generated that describes the positions of the cores with respect to the cross section of the multi-core fiber such that variations can be quantified.

Figure 8:
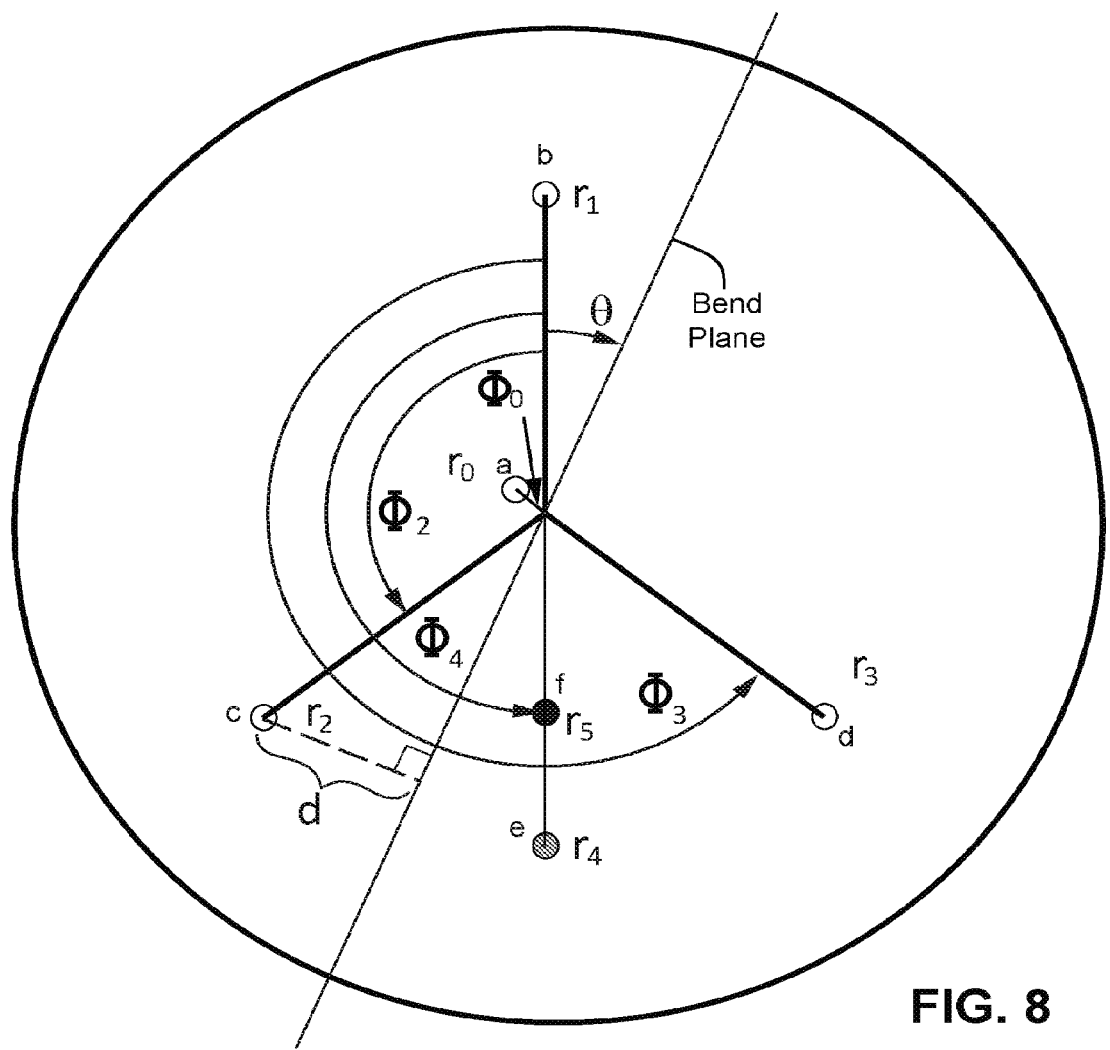
FIG. 8 shows a second twisted multicore fiber example embodiment with six cores.

As glass is a relatively hard material, it can be assumed that the geometry of the cross section of the multi-core fiber is preserved as the fiber is strained. This assures that the relative positions of the cores within a given cross section remain constant as the fiber is strained. This means that the fiber can be strained and still be used to accurately determine variations in core placement from the ideal configuration. A core position model that accounts for variation in core placement for a fiber with six cores (a-f) is depicted in FIG. 8. The auxiliary or redundant core is labeled f in FIG. 8, and the difference between the radius distances for peripheral cores b-e and the radius distance for peripheral core f is more than an insubstantial difference. For example, the difference divided by the average radius distance for all of peripheral cores b-f is 0.10 or more. Stated differently, the difference is 10% of the average radius distance for all of peripheral cores b-f. As in FIG. 3, the auxiliary or redundant core f may alternatively have a substantially longer radius than peripheral cores b-e, where again the radial distance difference is 10% of the average radius distance for all of cores b-f. In some embodiments, the average radius distance is calculated as the mean radius distance.

In an alternative example embodiment, the auxiliary redundant core f is located at the same radius as the other peripheral cores. Although the auxiliary redundant core may still be used to check the reliability of the data, this configuration is less effective at detecting errors on the central core.

In line with the equations already presented above in the first embodiment, if temperature is allowed to be an independent variable, then adding a $6^{th}$ core changes our starting equation from this:

$$\begin{bmatrix} \varepsilon_0 \\ \varepsilon_1 \\ \varepsilon_2 \\ \varepsilon_3 \\ \varepsilon_4 \end{bmatrix} = \begin{bmatrix} BY_0 & -BX_0 & R_0 & G_0 & T_0 \\ BY_1 & -BX_1 & R_1 & G_1 & T_1 \\ BY_2 & -BX_2 & R_2 & G_2 & T_2 \\ BY_3 & -BX_3 & R_3 & G_3 & T_3 \\ BY_4 & -BX_4 & R_4 & G_4 & T_4 \end{bmatrix} \begin{bmatrix} K_x \\ K_y \\ \Phi \\ E \\ T \end{bmatrix} \quad (26)$$

to this:

$$\begin{bmatrix} \varepsilon_0 \\ \varepsilon_1 \\ \varepsilon_2 \\ \varepsilon_3 \\ \varepsilon_4 \\ \varepsilon_5 \end{bmatrix} = \begin{bmatrix} BY_0 & BX_0 & R_0 & G_0 & T_0 \\ BY_1 & BX_1 & R_1 & G_1 & T_1 \\ BY_2 & BX_2 & R_2 & G_2 & T_2 \\ BY_3 & BX_3 & R_3 & G_3 & T_3 \\ BY_4 & BX_4 & R_4 & G_4 & T_4 \\ BY_5 & BX_5 & R_5 & G_5 & T_5 \end{bmatrix} \begin{bmatrix} K_x \\ K_y \\ \Phi \\ E \\ T \end{bmatrix} \quad (27)$$

Pulling out the last row produces an expression for the strain in the $6^{th}$ core, $\varepsilon_{5pred}$ as predicted by the physical state of the fiber (bend, twist, strain and temperature):

$$\varepsilon_5 = [BY_5 \quad BX_5 \quad R_5 \quad G_5 \quad T_5] \begin{bmatrix} K_x \\ K_y \\ \Phi \\ E \\ T \end{bmatrix} \quad (28)$$

All of these physical parameters can be determined from the other five cores:

$$\begin{bmatrix} BY_0 & -BX_0 & R_0 & G_0 & T_0 \\ BY_1 & -BX_1 & R_1 & G_1 & T_1 \\ BY_2 & -BX_2 & R_2 & G_2 & T_2 \\ BY_3 & -BX_3 & R_3 & G_3 & T_3 \\ BY_4 & -BX_3 & R_4 & G_4 & T_4 \end{bmatrix}^{-1} \begin{bmatrix} \varepsilon_0 \\ \varepsilon_1 \\ \varepsilon_2 \\ \varepsilon_3 \\ \varepsilon_4 \end{bmatrix} = \begin{bmatrix} K_x \\ K_y \\ \Phi \\ E \\ T \end{bmatrix}. \quad (29)$$

Substitution is used to obtain:

$$\varepsilon_{5pred} = [BY_5 \quad BX_5 \quad R_5 \quad G_5 \quad T_5] \begin{bmatrix} BY_0 & -BX_0 & R_0 & G_0 & T_0 \\ BY_1 & -BX_1 & R_1 & G_1 & T_1 \\ BY_2 & -BX_2 & R_2 & G_2 & T_2 \\ BY_3 & -BX_3 & R_3 & G_3 & T_3 \\ BY_4 & -BX_3 & R_4 & G_4 & T_4 \end{bmatrix}^{-1} \begin{bmatrix} \varepsilon_0 \\ \varepsilon_1 \\ \varepsilon_2 \\ \varepsilon_3 \\ \varepsilon_4 \end{bmatrix} \quad (30)$$

which is a closed form solution for the predicted value of the strain in the $6^{th}$ core. This can be reduced to a row operation:

$$[a \quad b \quad c \quad d \quad e] = \\ [BY_5 \quad BX_5 \quad R_5 \quad G_5 \quad T_5] \begin{bmatrix} BY_0 & -BX_0 & R_0 & G_0 & T_0 \\ BY_1 & -BX_1 & R_1 & G_1 & T_1 \\ BY_2 & -BX_2 & R_2 & G_2 & T_2 \\ BY_3 & -BX_3 & R_3 & G_3 & T_3 \\ BY_4 & -BX_3 & R_4 & G_4 & T_4 \end{bmatrix}^{-1} \quad (31)$$

to produce an algebraic expression for the predicted strain on the $6^{th}$ core:

$$\varepsilon_{5pred} = a\varepsilon_0 + b\varepsilon_1 + c\varepsilon_2 + d\varepsilon_3 e\varepsilon_4 \quad (32)$$

Subtracting the measured strain $\varepsilon_{5meas}$ from the predicted strain provides the error term, $\Delta$:

$$\varepsilon_{5pred} - \varepsilon_{5meas} = \Delta = a\varepsilon_0 + b\varepsilon_1 + c\varepsilon_2 + d\varepsilon_3 + e\varepsilon_3 - \varepsilon_{5meas} \quad (33)$$

The inversion matrix of the physical parameters is calculated and expressed as a matrix of entries:

$$\begin{bmatrix} BY_0 & -BX_0 & R_0 & G_0 & T_0 \\ BY_1 & -BX_1 & R_1 & G_1 & T_1 \\ BY_2 & -BX_2 & R_2 & G_2 & T_2 \\ BY_3 & -BX_3 & R_3 & G_3 & T_3 \\ BY_4 & -BX_3 & R_4 & G_4 & T_4 \end{bmatrix}^{-1} = \begin{bmatrix} h_{00} & h_{01} & h_{02} & h_{03} & h_{04} \\ h_{10} & h_{11} & h_{12} & h_{13} & h_{14} \\ h_{20} & h_{21} & h_{22} & h_{23} & h_{24} \\ h_{30} & h_{31} & h_{32} & h_{33} & h_{34} \\ h_{40} & h_{41} & h_{42} & h_{43} & h_{44} \end{bmatrix} = H \quad (34)$$

A concise expression is constructed for the calculation of all of the physical parameters as well as the new parameter $\Delta$ that is a measure of the how well the measured strains match the model:

$$M\begin{bmatrix} \varepsilon_0 \\ \varepsilon_1 \\ \varepsilon_2 \\ \varepsilon_3 \\ \varepsilon_4 \\ \varepsilon_5 \end{bmatrix} = \begin{bmatrix} h_{00} & h_{01} & h_{02} & h_{03} & h_{04} & 0 \\ h_{10} & h_{11} & h_{12} & h_{13} & h_{14} & 0 \\ h_{20} & h_{21} & h_{22} & h_{23} & h_{24} & 0 \\ h_{30} & h_{31} & h_{32} & h_{33} & h_{34} & 0 \\ h_{40} & h_{41} & h_{42} & h_{43} & h_{44} & 0 \\ a & b & c & d & e & -1 \end{bmatrix} \begin{bmatrix} \varepsilon_0 \\ \varepsilon_1 \\ \varepsilon_2 \\ \varepsilon_3 \\ \varepsilon_4 \\ \varepsilon_5 \end{bmatrix} = \begin{bmatrix} K_x \\ K_y \\ \Phi \\ E \\ T \\ \Delta \end{bmatrix} \quad (35)$$

In a practical example for the second embodiment, to find the strain (E) and temperature (7) independently, the other three parameters (twist ($\Phi$), bend-x ($K_x$), and bend-y ($K_y$)) are determined, and the fiber is calibrated for all of these effects.

The calibration begins by determining the core geometries (radii and angles) for all five cores, (see FIG. 8), and then suspending the fiber inside a tube furnace or other suitable temperature-controlled environment. By measuring the strain in the cores at different temperatures and different strains, values for the parameters $G_n$ and $T_n$ for equation (27) are determined. The six core optical sensing fiber is calibrated with an additional set of data taken with the fiber under tension, and one more set of data with the fiber heated. From these data sets, the matrix in equation (29) is determined for calculating fiber pitch ($K_x$), yaw ($K_y$), twist ($\Phi$), strain (E), and temperature (T) from the OFDR measurements for the five cores.

$$\begin{bmatrix} \text{pitch} \\ \text{yaw} \\ \text{twist} \\ \text{strain} \\ \text{temperature} \\ \Delta \end{bmatrix} = \begin{bmatrix} K_x \\ K_y \\ \Phi \\ E \\ T \\ \Delta \end{bmatrix} = \overline{\overline{M}} \begin{bmatrix} \varepsilon_0 \\ \varepsilon_1 \\ \varepsilon_2 \\ \varepsilon_3 \\ \varepsilon_4 \\ \varepsilon_5 \end{bmatrix} \quad (36)$$

The calibration procedure and equations are similar to those used in the first embodiment with the additional calibration for temperature. Elevating the temperature of the fiber allows determination of the temperature response (T) of each core.

$$\begin{bmatrix} \varepsilon_0 \\ \varepsilon_1 \\ \varepsilon_2 \\ \varepsilon_3 \\ \varepsilon_4 \\ \varepsilon_5 \end{bmatrix} = \begin{bmatrix} BY_0 & -BX_0 & R_0 & G_0 & T_0 \\ BY_1 & -BX_1 & R_1 & G_1 & T_1 \\ BY_2 & -BX_2 & R_2 & G_2 & T_2 \\ BY_3 & -BX_3 & R_3 & G_3 & T_3 \\ BY_4 & -BX_4 & R_4 & G_4 & T_4 \\ BY_5 & -BX_5 & R_5 & G_5 & T_5 \end{bmatrix} \begin{bmatrix} K_x \\ K_y \\ \Phi \\ E \\ T \end{bmatrix} \quad (37)$$

This completes the matrix relating the individual core responses to the aggregate linear effects of Pitch, Yaw, Twist, Tension, and Temperature. This matrix is used to calculate the error term and all of the physical parameters as described above.

Figure 9:
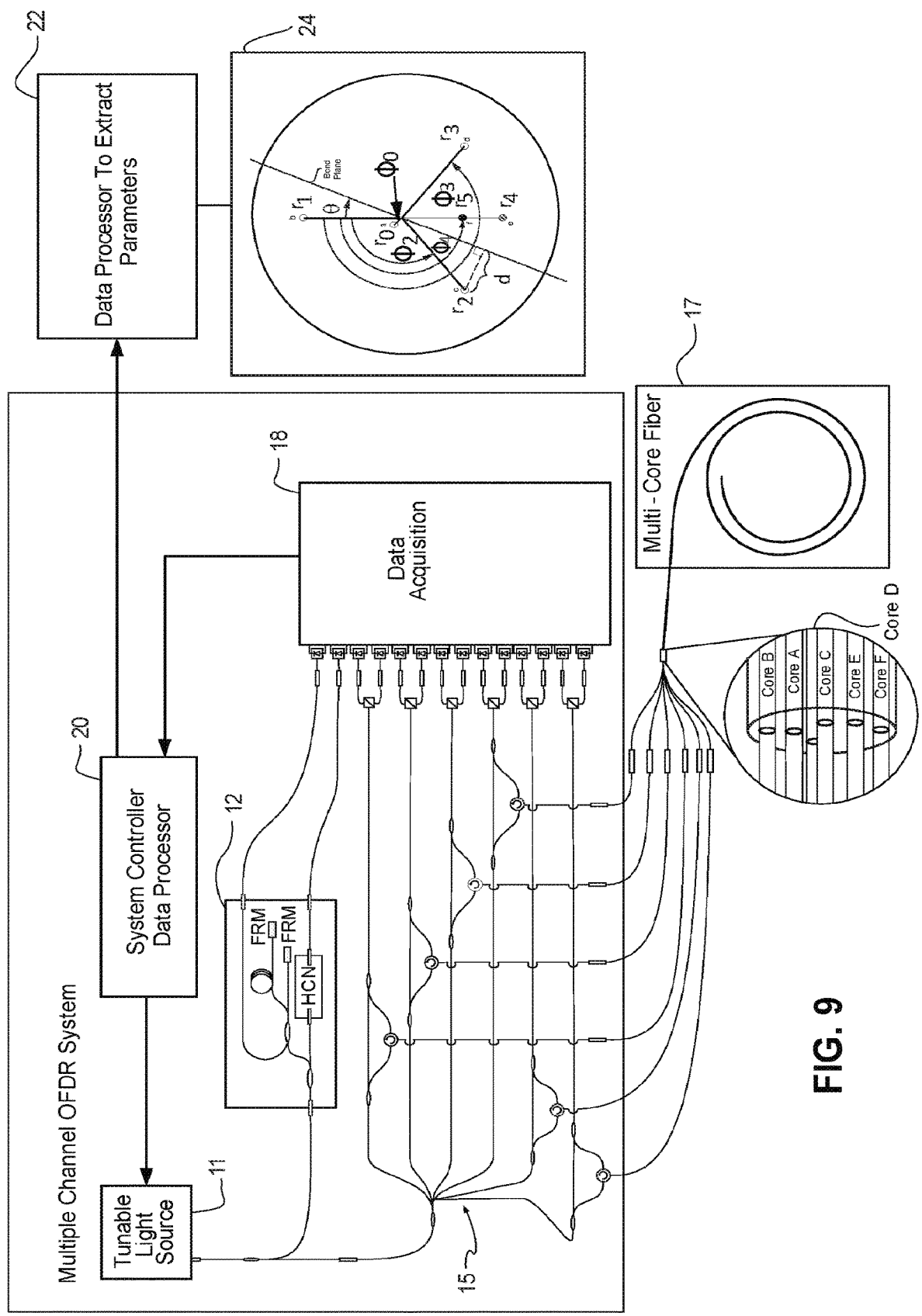
FIG. 9 shows a schematic diagram of a second example embodiment of an OFDR-based shape sensing system that compensates for temperature and identifies errors independent from the model and assumptions of the shape sensing system using a six core fiber.

FIG. 9 shows a schematic diagram of a second example embodiment of an OFDM-based shape sensing system that compensates for temperature and identifies errors independent from the model and assumptions of the shape sensing system using a six core fiber. FIG. 9 is similar to FIG. 4 with the addition of optics and processing to accommodate six cores (a-f) in the fiber 17.

Interferometric interrogators 15 are connected to respective individual cores in a length of sensing fiber 17. Light enters the sensing fiber 17 through the measurement arms of the five interferometric interrogators referenced generally at 15 corresponding to six core waveguides a, b, c, d, e, and f in the fiber 17. Scattered light from each core the sensing fiber 17 is then interfered with light that has traveled along the reference arm of the corresponding interferometric interrogator 15. As the tunable light source 10 is swept, each channel is simultaneously measured, and the resulting interference pattern from each channel is routed to the data acquisition electronics 18 adapted for the additional interferometric interrogators 15. Each channel is processed independently and identically using the OFDR procedures described above but also processing the temperature sensing and error detection cores.

Figure 10:
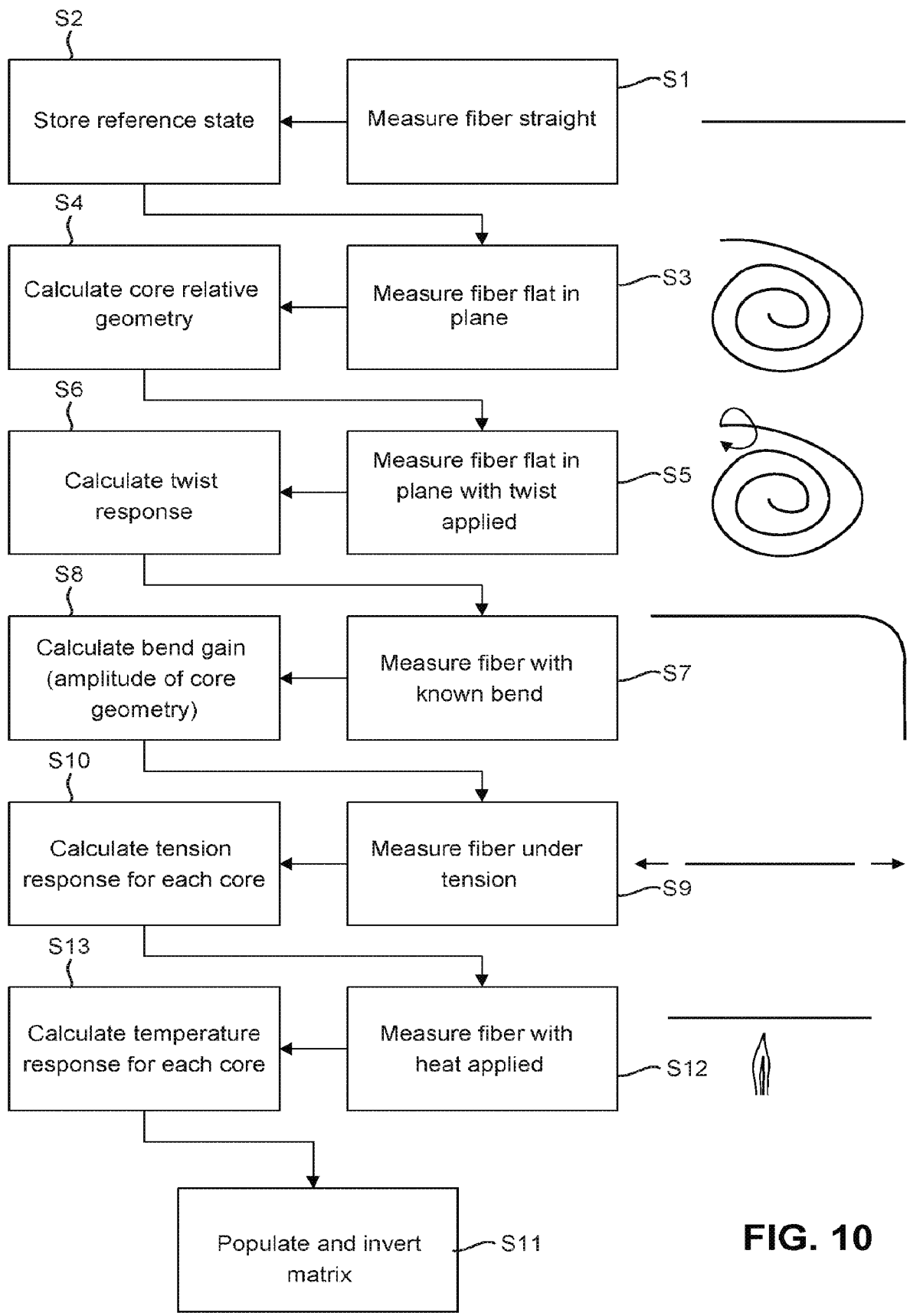
FIG. 10 is a flowchart diagram for calibrating the optical shape sensing fiber in the second example embodiment.

FIG. 10 is a flowchart diagram for calibrating a six core optical shape sensing fiber. Steps S1-S11 are the same as for FIG. 5. In addition, the fiber is exposed to increased temperature in a temperature controlled environment (step S12), and a temperature response is calculated for each core (step S13). The values needed to populate the matrix in equation (37) described above are then available (step S11), and that matrix M can be calculated (equations (31)-(35)) and used to compensate for temperature in shape sensing applications using that shape sensing fiber and to detect any error.

Figure 11:
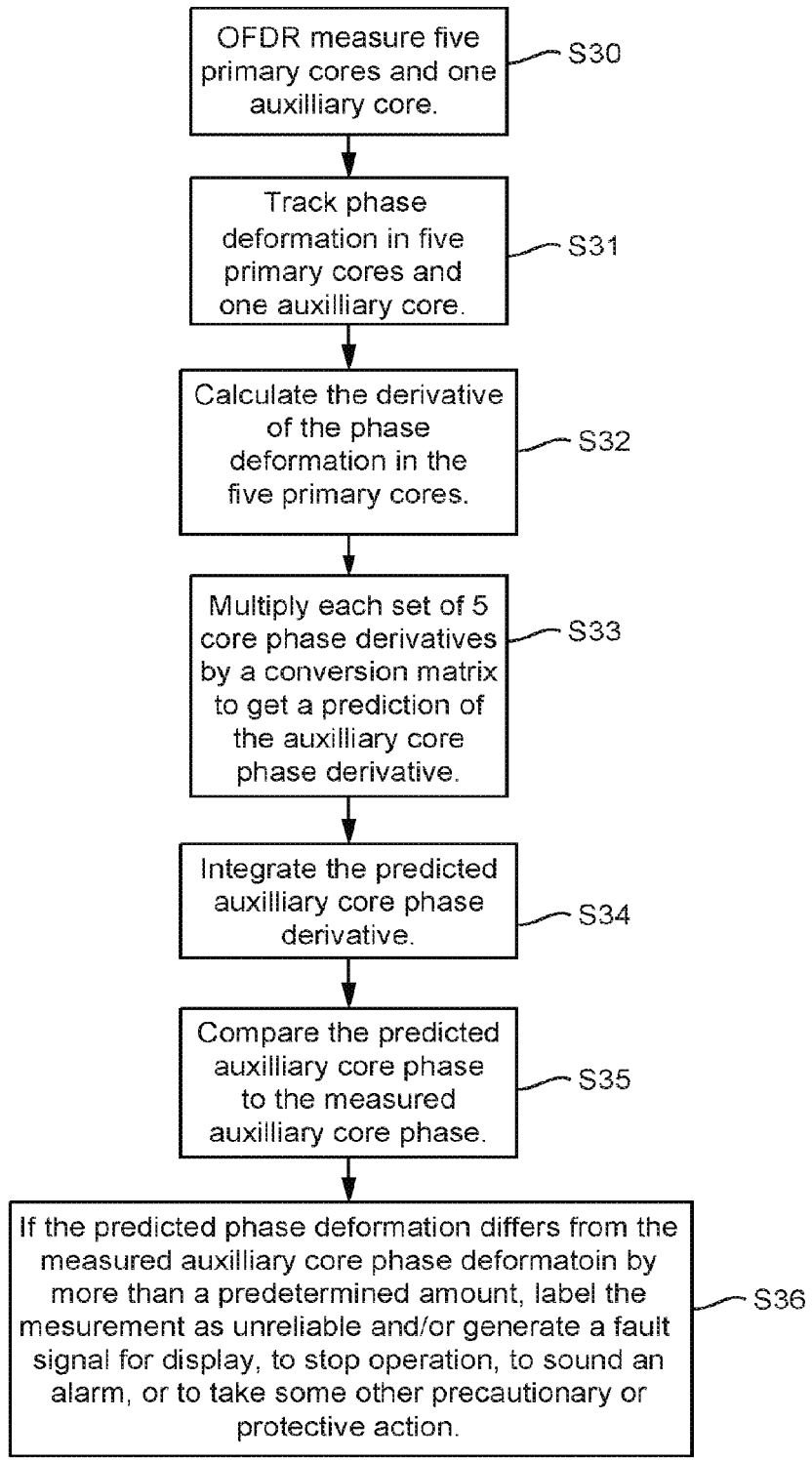
FIG. 11 is a flowchart diagram for detecting an error in shape sensing system of the second example embodiment.

FIG. 11 is a flowchart diagram for detecting an error in shape sensing system of the second example embodiment. Initially, the calibrated shape sensing fiber is placed as desired for shape sensing, and OFDR scatter measurements are obtained for each of the six cores (step S30). The data processor 22 tracks the optical phase signal for each core determined from these scatter measurements as compared to the calibrated reference scatter patterns for each corresponding core for this fiber (step S31). Each of the optical phase signals is a measure of shift in delay of the local scatters along the length of its respective core in the sensing fiber. The derivative of this optical phase signal is calculated for each of the five primary cores (step S32), which is directly proportional to change in physical length of its respective core. Each of the six phase derivatives is multiplied by the matrix M to calculate the applied bend, twist, strain, and an error term. If this error term exceeds a certain magnitude, the OFDR shape sensing measurements are labeled unreliable and/or one or more the following actions is taken or initiated: generate a fault signal for display, stop operation of the system or machine associated with the shape sensing fiber, generate an alarm, and/or take some other precautionary or protection action (step S36).

If new sensed parameters are added in the same way that temperature sensing was added in the second example embodiment, then an extra core is for redundancy. The addition of more than one redundant core is readily accommodated using the approach described above and provides further assurance of the reliability and integrity of shape sensing measurements.

Whenever it is described in this document that a given item is present in "some embodiments," "various embodiments," "certain embodiments," "certain example embodiments, "some example embodiments," "an exemplary embodiment," or whenever any other similar language is used, it should be understood that the given item is present in at least one embodiment, though is not necessarily present in all embodiments. Consistent with the foregoing, whenever it is described in this document that an action "may," "can," or "could" be performed, that a feature, element, or component "may," "can," or "could" be included in or is applicable to a given context, that a given item "may," "can," or "could" possess a given attribute, or whenever any similar phrase involving the term "may," "can," or "could" is used, it should be understood that the given action, feature, element, component, attribute, etc. is present in at least one embodiment, though is not necessarily present in all embodiments. Terms and phrases used in this document, and variations thereof, unless otherwise expressly stated, should be construed as open-ended rather than limiting. As examples of the foregoing: "and/or" includes any and all combinations of one or more of the associated listed items (e.g., a and/or b means a, b, or a and b); the singular forms "a", "an" and "the" should be read as meaning "at least one," "one or more," or the like; the term "example" is used provide examples of the subject under discussion, not an exhaustive or limiting list thereof; the terms "comprise" and "include" (and other conjugations and other variations thereof) specify the presence of the associated listed items but do not preclude the presence or addition of one or more other items; and if an item is described as "optional," such description should not be understood to indicate that other items are also not optional.

As used herein, the term "non-transitory computer-readable storage medium" includes a register, a cache memory, a ROM, a semiconductor memory device (such as a D-RAM, S-RAM, or other RAM), a magnetic medium such as a flash memory, a hard disk, a magneto-optical medium, an optical medium such as a CD-ROM, a DVD, or Blu-Ray Disc, or other type of device for non-transitory electronic data storage. The term "non-transitory computer-readable storage medium" does not include a transitory, propagating electromagnetic signal.

Although various embodiments have been shown and described in detail, the claims are not limited to any particular embodiment or example. The technology fully encompasses other embodiments which may become apparent to those skilled in the art. None of the above description should be read as implying that any particular element, step, range, or function is essential such that it must be included in the claims scope. The scope of patented subject matter is defined only by the claims. The extent of legal protection is defined by the words recited in the claims and their equivalents. All structural and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the technology described, for it to be encompassed by the present claims. No claim is intended to invoke paragraph 6 of 35 USC § 112 unless the words "means for" or "step for" are used. Furthermore, no embodiment, feature, component, or step in this specification is intended to be dedicated to the public regardless of whether the embodiment, feature, component, or step is recited in the claims.

What is claimed is:

1. An interferometric measurement system for measuring an optical shape sensor comprising multiple primary cores in the optical shape sensor and an auxiliary core in the optical shape sensor, the system comprising:
    interferometric detection circuitry configured to detect measurement interferometric pattern data associated with each of the multiple primary cores and the auxiliary core; and
    data processing circuitry configured to:
        determine a shape of the optical shape sensor based on the detected measurement interferometric pattern data for the multiple primary cores,
        determine a predicted phase or strain value of the auxiliary core based in part on the detected measurement interferometric pattern data for the multiple primary cores,
        determine a measurement-based phase or strain value of the auxiliary core based on the detected measurement interferometric pattern data for the auxiliary core,
        determine a difference between the predicted phase or strain value of the auxiliary core and the measurement-based phase or strain value of the auxiliary core, and
        detect an error associated with the determined shape of the optical shape sensor based on the difference.

2. The system of claim 1, wherein the optical shape sensor comprises a multi-core optical fiber containing the multiple primary cores and the auxiliary core.

3. The system of claim 1, wherein the interferometric detection circuitry comprises multiple interferometric interrogators, each interferometric interrogator paired with an associated core to form an associated acquisition channel, wherein the associated core is selected from the group consisting of the multiple primary cores and the auxiliary core, and wherein the interferometric detection circuitry is configured to detect the measurement interferometric pattern data by:
    coupling light from a tunable light source into the multiple primary cores and the auxiliary core via the interferometric interrogators;
    in each interferometric interrogator of the multiple interferometric interrogators, interfering light reflected in the associated core with reference light to form an interference pattern of the associated acquisition channel; and
    converting the interference pattern of the associated acquisition channels associated with the multiple primary cores and the auxiliary core into electrical signals, the electrical signals corresponding to the measurement interferometric pattern data.

4. The system of claim 3, wherein the light source is scanned through a range of optical frequencies, and wherein the data processing circuitry is configured to:
    resample the measurement interferometric pattern data at increments constant in optical frequency, and
    transform the resampled measurement interferometric pattern data into a temporal domain, the temporal domain corresponding to length along the optical shape sensor.

5. The system of claim 1, wherein the data processing circuitry is configured to detect the error by:
    determining that the difference exceeds a predetermined amount.

6. The system of claim 1, wherein the data processing circuitry is further configured to cause a precautionary action in response to the error.

7. The system of claim 1, wherein the data processing circuitry is further configured to, based on the error, perform at least one action selected from the group consisting of:
    labeling the determined shape of the optical shape sensor as unreliable;
    generating a fault signal for display;
    generating an alarm;
    stopping operation of the interferometric measurement system; and
    stopping operation of a machine associated with the optical shape sensor.

8. The system of claim 1, wherein the data processing circuitry is further configured to:
determine an electronic or optical error in the interferometric detection circuitry based on the error.

9. The system of claim 1, wherein the data processing circuitry is configured to determine the shape of the optical shape sensor by:
determining parameters equal in number to the multiple primary cores.

10. The system of claim 9, wherein the parameters are selected from the group consisting of pitch bending, yaw bending, twist, common mode strain, and temperature of the optical shape sensor.

11. The system of claim 1, wherein the predicted phase or strain value of the auxiliary core is a predicted strain value, wherein the measurement-based phase or strain value of the auxiliary core is a measurement-based strain value, and wherein the data processing circuitry is configured to determine the predicted strain value of the auxiliary core by:
determining strains in the multiple primary cores based on the measurement interferometric pattern data for the multiple primary cores; and
calculating the predicted strain value in the auxiliary core based on a physical model of the optical shape sensor and the determined strains in the multiple primary cores.

12. The system of claim 1, wherein the predicted phase or strain value of the auxiliary core is a predicted phase value, wherein the measurement-based phase or strain value of the auxiliary core is a measurement-based phase value, and wherein the data processing circuitry is configured to determine the predicted phase value of the auxiliary core and the measurement-based phase value of the auxiliary core by:
tracking optical phase signals based on the measurement interferometric pattern data for the multiple primary cores as compared to reference interferometric pattern data determined for the multiple primary cores;
calculating derivatives of the optical phase signals for the multiple primary cores;
determining a predicted optical phase derivative for the auxiliary core based on the calculated derivatives of the optical phase signals for the multiple primary cores; and
integrating the predicted optical phase derivative for the auxiliary core to obtain a predicated optical phase value for the auxiliary core.

13. The system of claim 1, further comprising the optical shape sensor, wherein the multiple primary cores comprise a center core and peripheral cores at a first radial distance from the center core, and wherein the auxiliary core is at a second radial distance from the center core, the second radial distance different by at least 10% from the first radial distance.

14. A method for measuring an optical shape sensor, the optical shape sensor comprising multiple primary cores and an auxiliary core, the method comprising:
detecting measurement interferometric pattern data associated with each of the multiple primary cores and the auxiliary core;
processing the detected measurement interferometric pattern data for the multiple primary cores to determine a shape of the optical shape sensor;
processing the detected measurement interferometric pattern data for the multiple primary cores to determine a predicted phase or strain value of the auxiliary core;
processing the detected measurement interferometric pattern data for the auxiliary core to determine a measurement-based phase or strain value of the auxiliary core;
determining a difference between the predicted phase or strain value of the auxiliary core and the measurement-based phase or strain value of the auxiliary core; and
detecting an error associated with the determined shape of the optical shape sensor based on the difference.

15. The method of claim 14, wherein the optical shape sensor comprises a multi-core optical fiber containing the multiple primary cores and the auxiliary core.

16. The method of claim 14, wherein detecting measurement interferometric pattern data associated with each of the multiple primary cores and the auxiliary core comprises:
coupling light from a tunable light source into the multiple primary cores and the auxiliary core;
for each core of the multiple primary cores and the auxiliary core, interfering light reflected in the core with reference light to form an interference pattern associated with the core; and
converting the interference patterns associated with the multiple primary cores and the auxiliary core into electrical signals.

17. The method of claim 14, further comprising:
causing a precautionary action in response to the error.

18. The method of claim 14, wherein the predicted phase or strain value of the auxiliary core is a predicted strain value, wherein the measurement-based phase or strain value of the auxiliary core is a measurement-based strain value, and wherein processing the detected measurement interferometric pattern data for the multiple primary cores to determine the predicted strain value of the auxiliary core comprises:
determining strains in the multiple primary cores based on the measurement interferometric pattern data for the multiple primary cores; and
calculating the predicted strain value in the auxiliary core based on a physical model of the optical shape sensor and the determined strains in the multiple primary cores.

19. The method of claim 14, wherein the predicted phase or strain value of the auxiliary core is a predicted phase value, wherein the measurement-based phase or strain value of the auxiliary core is a measurement-based phase value, and wherein processing the detected measurement interferometric pattern data for the multiple primary cores to determine the predicted phase value of the auxiliary core and the measurement-based phase value of the auxiliary core comprises:
tracking optical phase signals based on the measurement interferometric pattern data for the multiple primary cores as compared to reference interferometric pattern data determined for the multiple primary cores;
calculating derivatives of the optical phase signals for the multiple primary cores;
determining a predicted optical phase derivative for the auxiliary core based on the calculated derivatives of the optical phase signals for the multiple primary cores; and
integrating the predicted optical phase derivative for the auxiliary core to obtain a predicated optical phase value for the auxiliary core.

20. A system for measuring an optical shape sensor, the optical shape sensor comprising multiple primary cores and an auxiliary core, the system comprising:
means to interferometrically interrogate the multiple primary cores and the auxiliary core to detect measurement interferometric pattern data for the multiple primary cores and the auxiliary core; and means to process the measurement interferometric pattern data to:

determine a shape of the optical shape sensor from the measurement interferometric pattern data for the multiple primary cores, determine a predicted phase or strain value of the auxiliary core based in part on the detected measurement interferometric pattern data for the multiple primary cores, determine a measurement-based phase or strain value of the auxiliary core based on the detected measurement interferometric pattern data for the auxiliary core, determine a difference between the predicted phase or strain value of the auxiliary core and the measurement-based phase or strain value of the auxiliary core, and detect an error associated with the determined shape of the optical shape sensor based on the difference.

* * * * *